United States Patent [19]
Shimoda et al.

[11] Patent Number: 5,751,893
[45] Date of Patent: May 12, 1998

[54] VARIABLE LENGTH CODE RECORDING/ PLAYBACK APPARATUS

[75] Inventors: Kenji Shimoda; Shuji Abe; Kouichi Kurihara, all of Tokyo, Japan

[73] Assignee: Kabushiki Kaisha Toshiba, Tokyo, Japan

[21] Appl. No.: 35,755

[22] Filed: Mar. 24, 1993

[30] Foreign Application Priority Data

| Mar. 24, 1992 | [JP] | Japan | 4-066369 |
| Mar. 24, 1992 | [JP] | Japan | 4-066370 |
| Mar. 25, 1992 | [JP] | Japan | 4-067609 |
| Mar. 25, 1992 | [JP] | Japan | 4-067611 |

[51] Int. Cl.$^6$ .................................................. H04N 5/917
[52] U.S. Cl. ......................... 386/111; 386/68; 386/33; 348/390
[58] Field of Search ........................ 360/10.1–10.3, 360/33.1, 18, 24; 358/133, 335; 348/384, 397, 398, 423, 390, 553; 386/111, 68, 33

[56] References Cited

U.S. PATENT DOCUMENTS

| 4,920,426 | 4/1990 | Hatori et al. ............... 358/133 X |
| 5,122,875 | 6/1992 | Raychaudhuri et al. ..... 348/423 X |
| 5,136,391 | 8/1992 | Minami .......................... 360/10.3 X |
| 5,140,437 | 8/1992 | Yonemitsu et al. ........... 360/33.1 X |
| 5,175,631 | 12/1992 | Juri et al. ..................... 360/33.1 X |

FOREIGN PATENT DOCUMENTS

| 0367264 | 5/1990 | European Pat. Off. . |
| 2117289 | 5/1990 | Japan . |
| 3106190 | 5/1991 | Japan . |
| 414973 | 1/1992 | Japan . |
| 479681 | 3/1992 | Japan . |
| 9100671 | 1/1991 | WIPO . |

OTHER PUBLICATIONS

Pereira et al., "A CCITT Compatible Coding Algorithm for Digital Recording of Moving Images", Signal Processing. Image Communication, vol. 2, No. 2, Aug. 1990, Amsterdam NL pp. 155–169.

Herpel et al., "Adaptation and Improvement of CCITT Reference Model 8 Video Coding for Digital Storage Media Applications", Signal Processing. Image Communication, vol. 2, No. 2, Aug. 1990, Amsterdam NL pp. 171–185.

*Primary Examiner*—Andrew L. Sniezek
*Attorney, Agent, or Firm*—Cushman, Darby & Cushman IP Group of Pillsbury Madison & Sutro LLP

[57] ABSTRACT

A variable length code recording/playback apparatus, which by encoding intra-frame data and inter-frame data in variable length code, records them as recorded codes on prescribed locations of tracks of a recording medium and plays them back, which includes a data rearranger for recording the data in areas to be played back at least two specific speed mode playbacks on the tracks by rearranging prescribed data out of the data encoded in variable length code, a variable length decoder for playing back the data recorded on the recording medium and decoding it in variable length code, a data restorer for controlling and restoring the time series of the output of the variable length decoder to the original data train before the rearrangement, and a decoder for constructing a playback picture from the decoded outputs for several frames in the specific speed mode playback by decoding the output of this data restorer.

10 Claims, 41 Drawing Sheets

Fig. 3
(PRIOR ART)
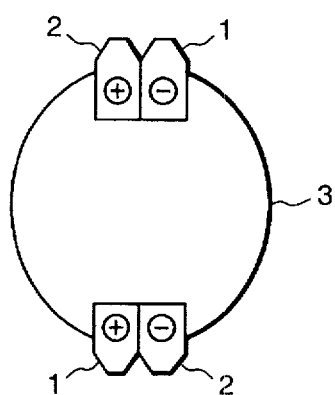
Fig. 4(a)
(PRIOR ART)
| FIRST FRAME | (a) ~ (c) |
| --- | --- |
| SECOND FRAME | (c) ~ (g) |
| THIRD FRAME | (g) ~ (i) |
Fig. 4(b)
(PRIOR ART)
| FIRST FRAME | (a) ~ (b) |
| --- | --- |
| THIRD FRAME | (b) ~ (d) |
| SECOND FRAME | (d) ~ (e) |
| SECOND FRAME | (e) ~ (f) |
| FIRST FRAME | (f) ~ (h) |
| THIRD FRAME | (h) ~ (i) |
Fig. 5
(PRIOR ART)
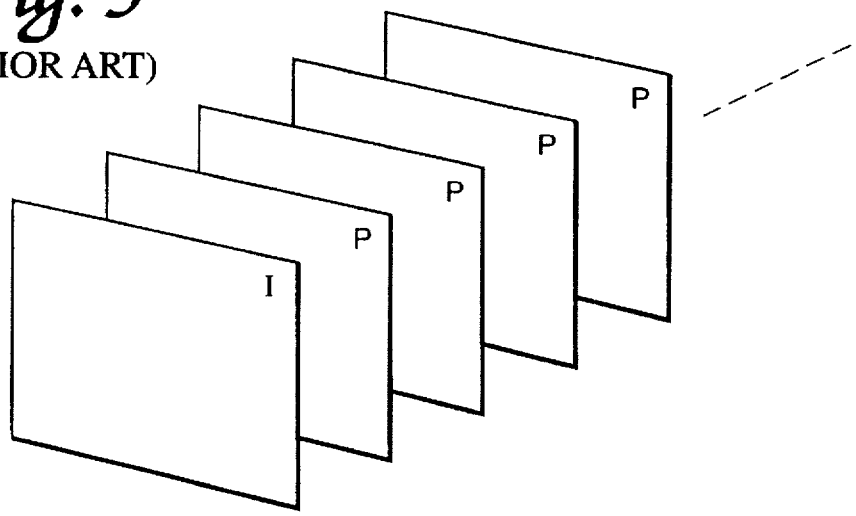

Fig. 11(a) (PRIOR ART)

| FIRST FRAME | SECOND FRAME | THIRD FRAME | FOURTH FRAME | FIFTH FRAME | SIXTH FRAME | SEVENTH FRAME | EIGHTH FRAME | NINTH FRAME |
|---|---|---|---|---|---|---|---|---|

→ TIME

Fig. 11(b) (PRIOR ART)

| $I_1$ | $B_2$ | $B_3$ | $P_4$ | $B_5$ | $B_6$ | $P_7$ | $B_8$ | $B_9$ | - - - |
|---|---|---|---|---|---|---|---|---|---|

Fig. 11(c) (PRIOR ART)

| $I_1$ | $P_4$ | $B_2$ | $B_3$ | $P_7$ | $B_5$ | $B_6$ | $P_{10}$ | $B_8$ | - - - |
|---|---|---|---|---|---|---|---|---|---|

Fig. 11(d) (PRIOR ART)

FIRST TRACK #1: $I_1$ | $P_4$ | $B_2$

SECOND TRACK #2: $B_3$ | $P_7$ | $B_5$ | $B_6$ | $P_{10}$

THIRD TRACK #3: $B_8$ | $B_9$ | - - -

Fig. 15
(PRIOR ART)
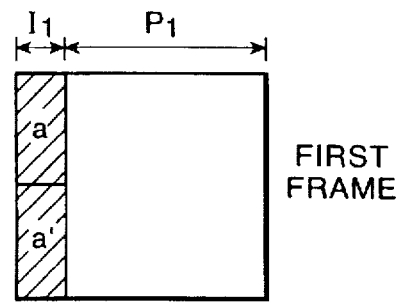
FIRST FRAME
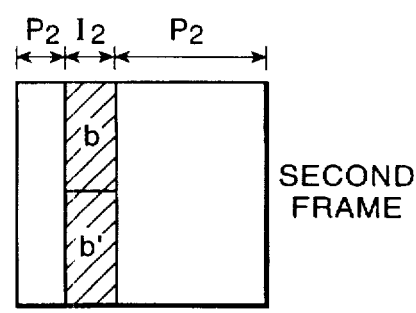
SECOND FRAME
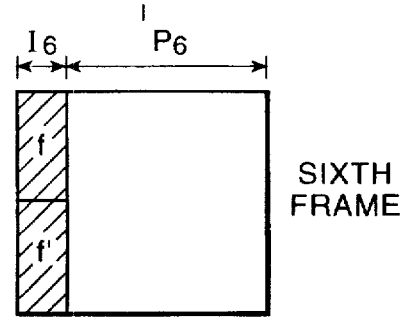
SIXTH FRAME
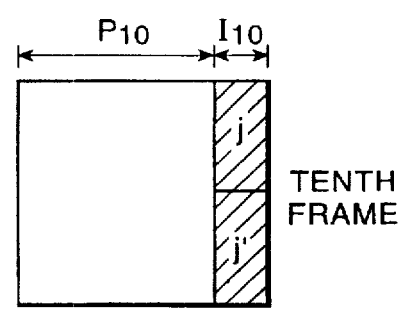
TENTH FRAME
Fig. 14
(PRIOR ART)
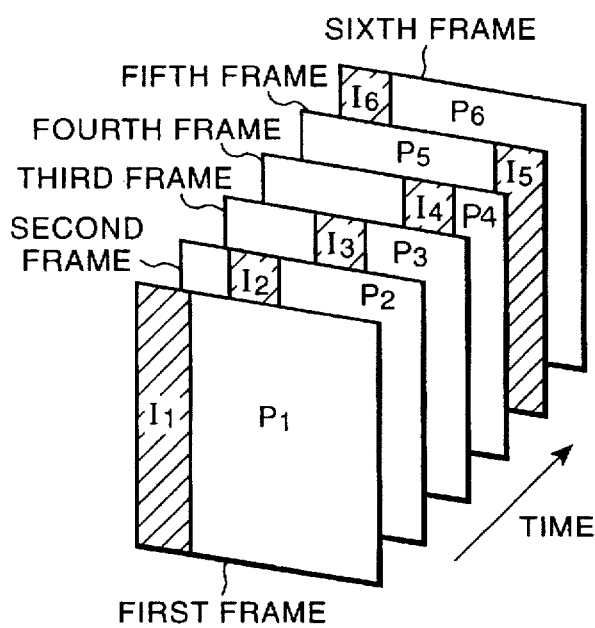

*Fig. 16(a)*
(PRIOR ART)
*Fig. 16(b)*
(PRIOR ART)
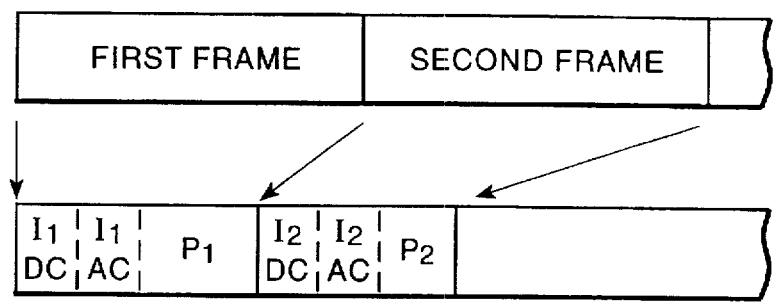
*Fig. 17*
(PRIOR ART)
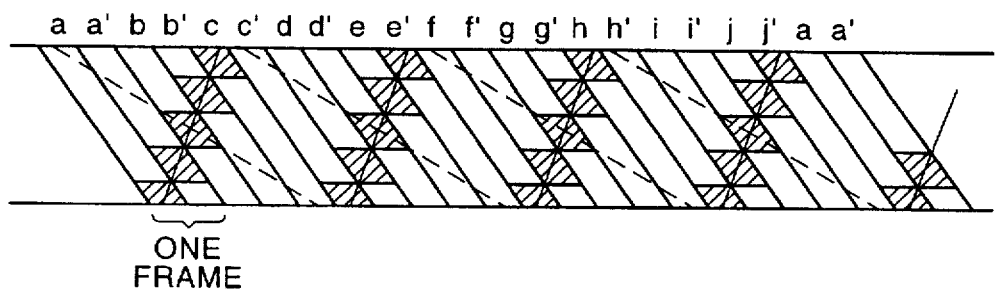

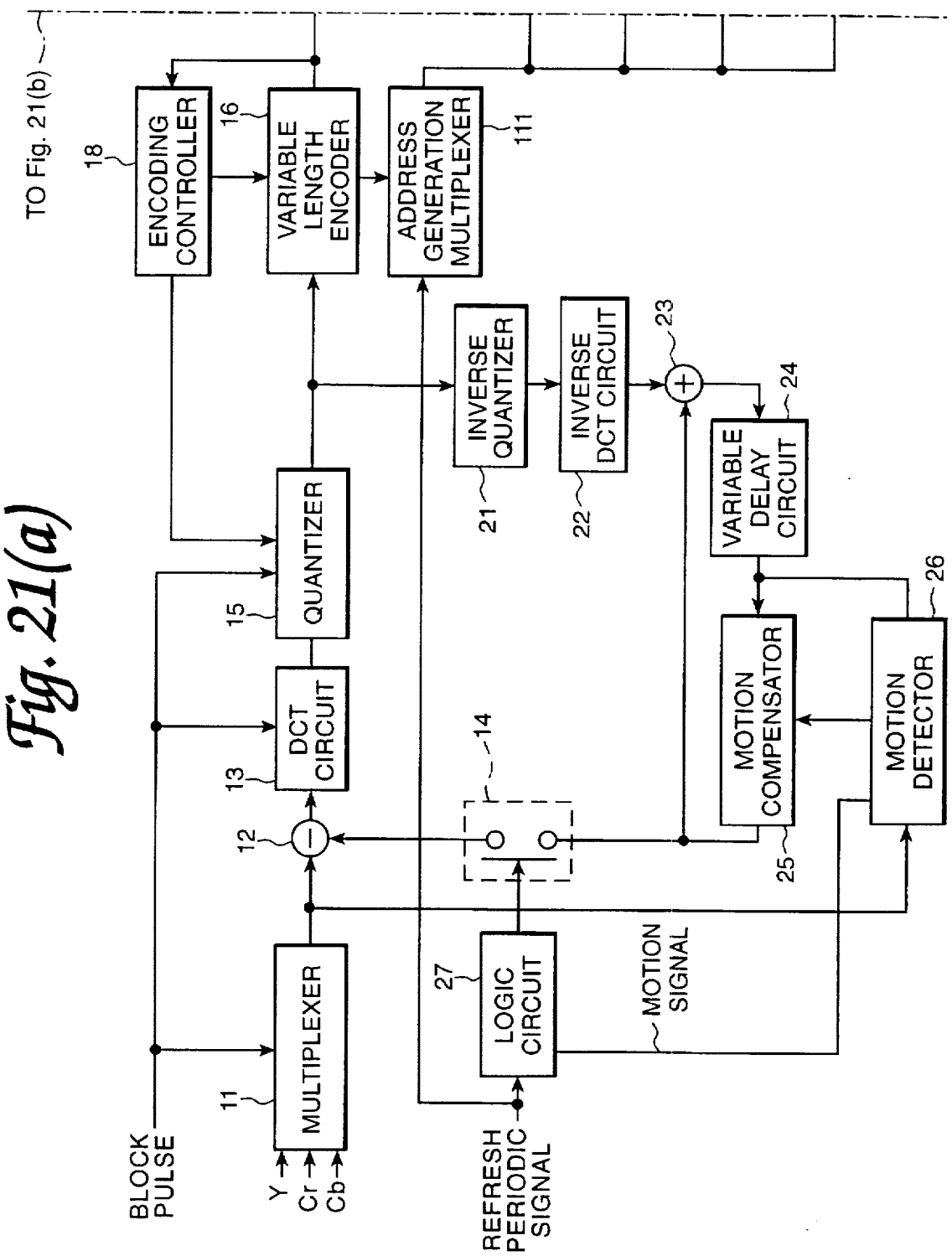

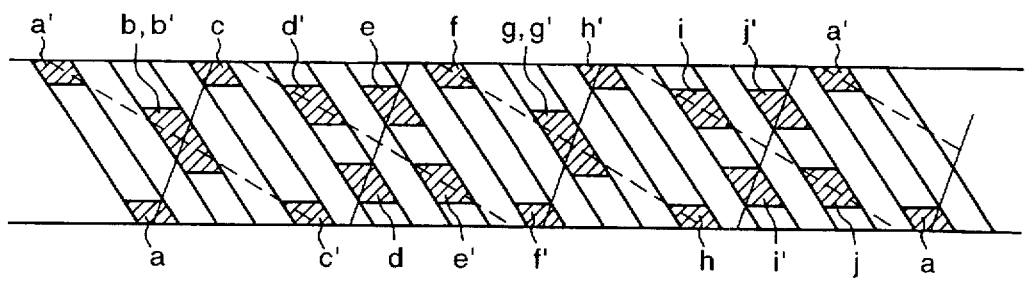

1 2 3 4 5 6 7 8 ······
TRACK NUMBER

X   Y   X   Y   X

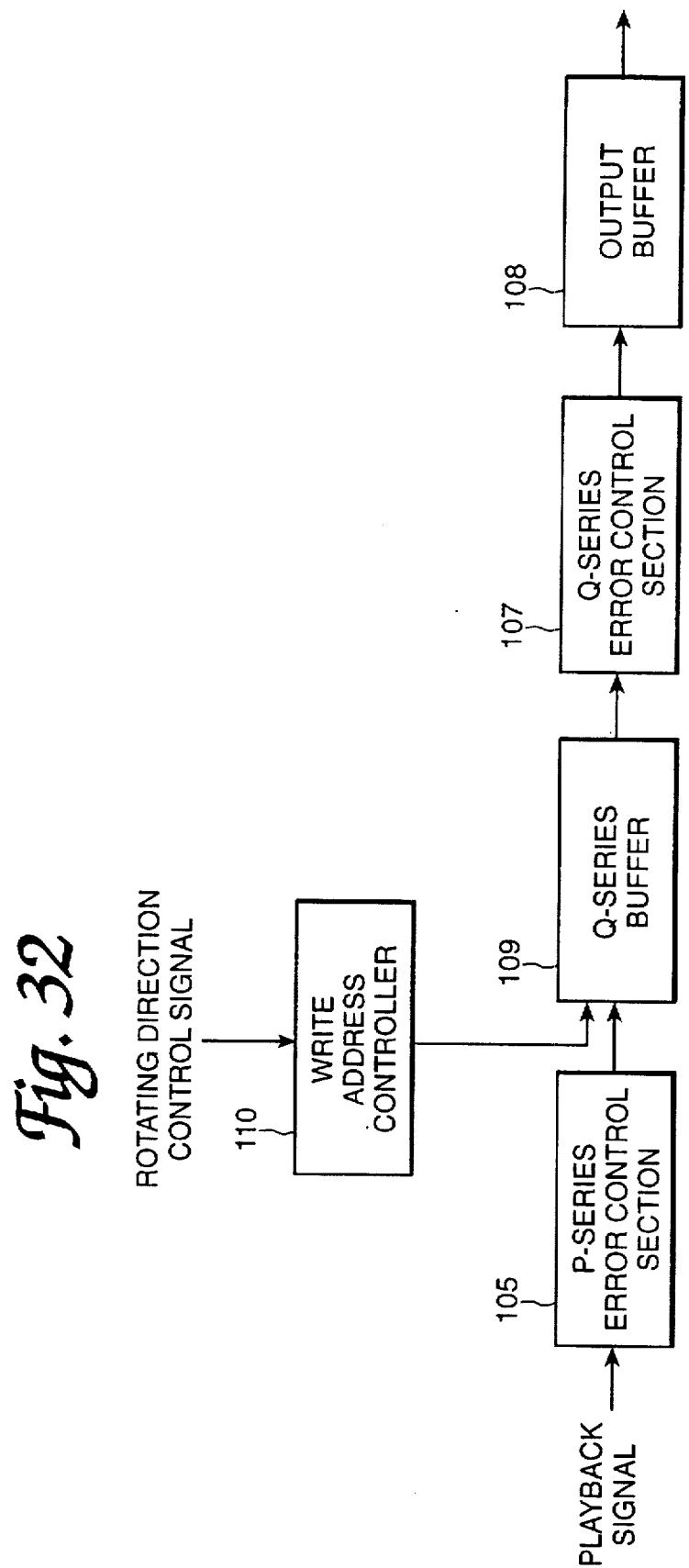

Fig. 39
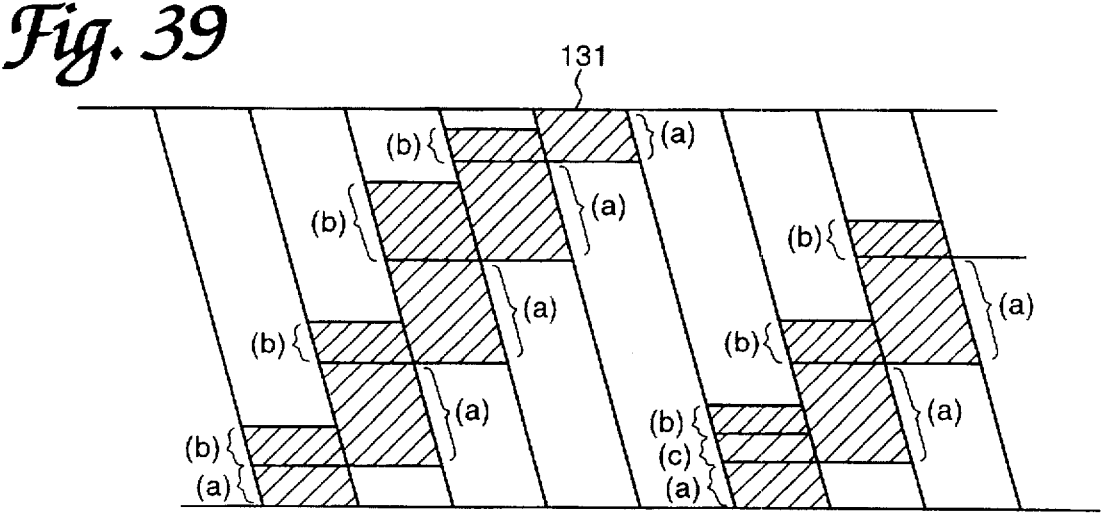
Fig. 40
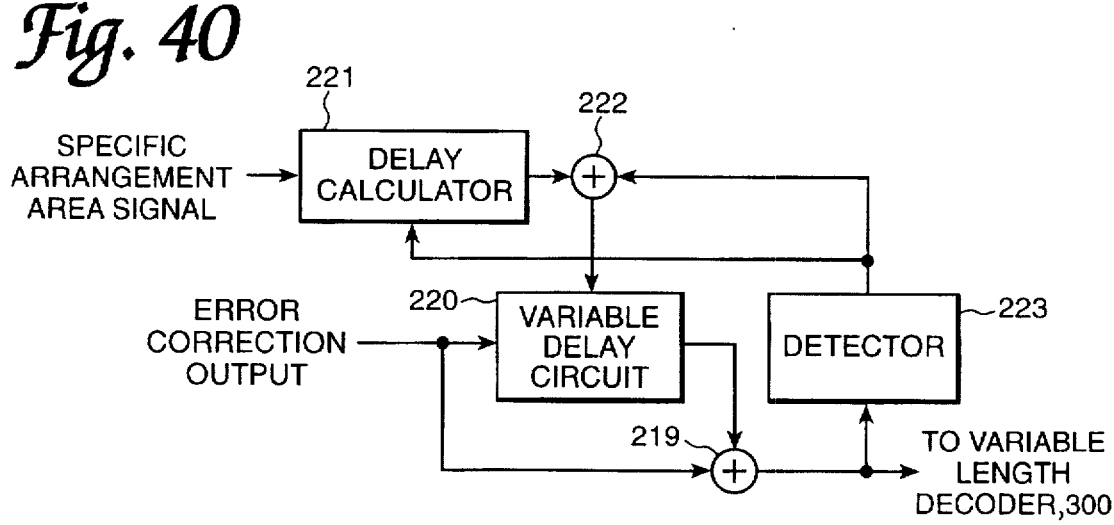
Fig. 41(a)
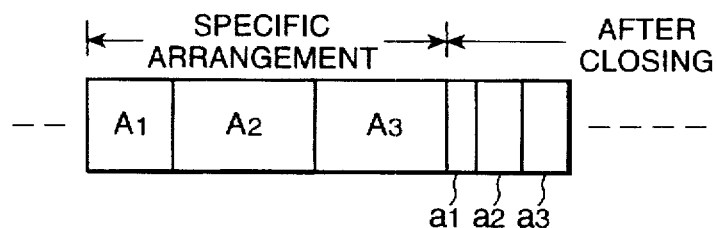
Fig. 41(b)
$$\begin{bmatrix} \text{INPUT} & \text{DELAY} & \\ \text{DATA} & \text{AMOUNT} & \text{OUTPUT} \\ A_1 & \Rightarrow (A_2+A_3) & \rightarrow A_1+a_1 \\ A_2 & \Rightarrow (A_3+a_1) & \rightarrow A_2+a_2 \\ A_3 & \Rightarrow (a_1+a_2) & \rightarrow A_3+a_3 \end{bmatrix}$$

DATA LENGTH

VARIABLE LENGTH CODE RECORDING/PLAYBACK APPARATUS

The present invention relates generally to a variable length code recording/playback apparatus, and more particularly, to a variable length code recording/playbacks apparatus, which is capable of maintaining a predetermined picture quality for a plurality of specialized mode playbacks.

BACKGROUND OF THE INVENTION

Digital processing of video data has greatly progressed in recent years. In particular, various systems for recording digital video data on a magnetic video cassette recorder (VCR) have been developed. FIG. 1 is a diagram which represents the relationship of the locations on a screen to the locations on the recording tracks of a recording medium in VCRs. FIG. 1(a) illustrates the locations on the screen and FIG. 1(b) illustrates the locations on the recording tracks.

FIG. 1(a) shows one picture frame vertically divided into eight sections. FIG. 1(b) illustrates the record locations of the first through ninth tracks similarly divided into eight sections. Video data are sequentially recorded on a recording medium starting from the lowest line A of the first track to its top line I. For instance, when recording one frame of data on one track, data displayed in a horizontal section defined by lines a and b on a screen are recorded on a longitudinal section defined by lines A and B on a recording medium, and thereafter, in a similar manner data displayed in horizontal sections defined by lines b through i on the screen are sequentially recorded on longitudinal sections defined by lines B through I on the recording medium. Further, for instance, when recording one frame of data on two tracks, data in the horizontal section defined by the lines a and e on the screen are recorded on the longitudinal section defined by the lines A and I of the first track #1 while data in the horizontal section defined by the lines e and i on the screen are recorded on the longitudinal section defined by the lines A and I of the second track #2.

FIGS. 2(a) through 2(d) are explanatory diagrams showing the relationship between trace patterns and playback signal envelopes at the triple-speed playback mode. FIG. 2(a) shows trace patterns at the triple-speed playback mode with a tracing period shown at the axis of abscissas and track pitch or tape traveling distance at the axis of ordinates. The signs "+" and "−" in the diagram represent the regular azimuths of the playback head, respectively. Further, numerals in the diagram show track numbers: odd numbered tracks are depicted in the plus azimuth and even numbered tracks are depicted in the minus azimuth. FIGS. 2(b) through 2(d) illustrate the signal envelope played back by the regular head, the playback output envelope obtained by the special head and the synthetic playback output envelope obtained by both heads. FIG. 3 is an explanatory diagram showing the construction of the recording/playback heads.

Now it is assumed that a rotary cylinder 3, as shown in FIG. 3, is used in the data recording and playback operations. The rotary cylinder 3 is provided with a pair of the regular heads 1 which have mutually different azimuths and a pair of the special heads 2 which have mutually different azimuths. Additionally, the azimuths of the regular head 1 and its adjacent special head 2 differ from each other. As shown by the sign "+" in FIG. 2(a), the first track and the third track are traced by the regular head 1 of the plus azimuth in the initial tracing period, and the fourth track and the sixth track are traced by the regular head 1 of the minus azimuth in the next tracing period. Thus, the playback signal envelope shown in FIG. 2(b) is obtained by the regular head 1. Further, the second track is traced by the special head 2 in the initial tracing period and the playback signal envelope shown in FIG. 2(c) is obtained in the same manner. By combining the playback output from the regular head 1 with the playback output from the special head 2, the synthetic playback output envelope shown in FIG. 2(d) is obtained.

The table 1 shown below represents relations among the playback outputs at the triple-speed mode playback (FIG. 2(d)), the tracing locations and the locations on the screen.

TABLE 1

| Playback Track | 1 Frame/1 Track | | 1 Frame/2 Tracks | |
|---|---|---|---|---|
| | Track | Frame | Track | Frame |
| 1 | #1 | 1st Frame | #1 | 1st Frame |
| | (A)–(C) | (a)–(c) | (A)–(C) | (a)–(c) |
| 2 | #2 | 2nd Frame | #2 | 1st Frame |
| | (C)–(G) | (c)–(g) | (C)–(G) | (f)–(h) |
| 3 | #3 | 3rd Frame | #3 | 2nd Frame |
| | (G)–(I) | (g)–(i) | (G)–(I) | (d)–(e) |
| 4 | #4 | 4th Frame | #4 | 2nd Frame |
| | (A)–(C) | (a)–(c) | (A)–(C) | (e)–(f) |
| 5 | #5 | 5th Frame | #5 | 3rd Frame |
| | (C)–(G) | (c)–(g) | (C)–(G) | (b)–(d) |
| 6 | #6 | 6th Frame | #6 | 3rd Frame |
| | (G)–(I) | (g)–(i) | (G)–(I) | (h)–(j) |
| 7 | #7 | 7th Frame | #7 | 4th Frame |
| | (A)–(C) | (a)–(c) | (A)–(C) | (a)–(b) |
| 8 | #8 | 8th Frame | #8 | 4th Frame |
| | (C)–(G) | (c)–(g) | (C)–(G) | (f)–(h) |
| 9 | #9 | 9th Frame | #9 | 5th Frame |
| | (G)–(I) | (g)–(i) | (G)–(I) | (a)–(b) |

As shown in FIG. 2(d) and Table 1, data A through C on the first track #1 are reproduced by the regular head 1 in the first ¼ time interval in the initial tracing period, data C through G on the second track #2 are reproduced by the special head 2 in the next ½ time, and data G through I on the third track are reproduced by the regular head 1 in the next ¼ time. Thereafter, data on three tracks are reproduced in a similar manner in one tracing period.

When one frame of video data is recorded on one track, the locations A through C on the first track #1 correspond to the locations a through c on the first frame of image, the locations C through G on the second track #2 correspond to the locations c through g on the second frame of the image, and the locations G through I on the third track #3 correspond to the locations g through i on the third frame of the image, as shown in Table 1. Therefore, at the triple-speed playback mode, the image patterns at the locations on the first through the third frames are combined and displayed as a playback image, as shown in FIG. 4(a).

Further, when one frame video of data is recorded on two tracks, the locations A through C on the first track #1 correspond to the locations a and b on the first frame, the locations C through G on the second track #2 correspond to the locations f through h on the first frame, and the locations G through I on the third track #3 correspond to the locations d through e on the second frame as shown in Table 1. Further, the locations A through C on the fourth track #4 correspond to the locations e and f on the second frame, the locations C through G on the fifth track #5 correspond to the locations b through d on the third frame, and the locations G through I on the sixth track #6 correspond to the locations h through i on the third frame. In this case, therefore, the image patterns at the locations on the first through the third frames are combined to create the playback image shown in FIG. 4(b).

Various proposals have been made in recent years for the standardization of high efficiency encoding for compressing video data. The high efficiency encoding technique is to encode video data at a lower bit rate for improving the efficiency of digital transmission and recording. For instance, the CCITT (Comite Consultatif International Telegraphique et Telephonique or International Telegraph and Telephone Consultative Committee) has issued a recommendation for video-conference/video-telephone standardization H.261. According to the CCITT recommendation, the encoding is to be performed by using the frame I processed by intra-frame compression and the frame P processed by inter-frame compression (or a predictive frame compression).

FIG. 5 is an explanatory diagram for explaining the video data compression according to the CCITT recommendation.

The frame I processed by intra-frame compression is the one frame of video data encoded by the DCT (Digital Cosine Transformation) process. The inter-frame compression processed frame P is the video data encoded by the predictive encoding method using the intra-frame compression processed frame I or the inter-frame compression processed frame P. In addition, a higher reduction of bit rate has been achieved by further encoding these encoded data by variable length encoding. As the intra-frame compression processed frame I was encoded by the intra-frame information only, it is possible to decode the intra-frame compression processed frame I from a single encoded data group. On the other hand however, the inter-frame compression processed frame P was encoded using correlations to other video data, thus the inter-frame compression processed frame P is impossible to decode from a single encoded data group.

FIG. 6 is a block diagram showing the recording section of a conventional recording/playback apparatus for variable length code using predictive encoding.

The luminance signal Y and the color difference signals Cr and Cb are applied to a multiplexer 11, where they are multiplexed in blocks of 8 pixels×8 horizontal tracing lines. The sampling rate of the color difference signals Cr and Cb in the horizontal direction is half (½) of the luminance signal Y. Therefore, in the period when two 8×8 luminance blocks are sampled, one 8×8 block of the color difference signals Cr and Cb is sampled. As shown in FIG. 7, two luminance signal blocks Y and each of the color difference signal blocks Cr and Cb forms a macro block. Here, two luminance signal blocks Y and each of the color difference blocks Cr and Cb represent the same location of the picture frame. The output of the multiplexer 11 is applied to a DCT circuit 13 through a subtracter 12.

When performing the intra-frame compression, a switch 14 is kept OFF and the output of the multiplexer 11 is input directly to the DCT circuit 13 as described later. A signal composed of 8×8 pixels per block is applied to the DCT circuit 13. The DCT circuit 13 converts the input signal into frequency components by the 8×8 two dimensional DCT (Digital Cosine Transformation) process. This makes it possible to reduce the spatial correlative components. The output of the DCT circuit 13 is applied to a quantizer 15 which lowers one block signal redundancy by requantizing the DCT output using a fixed quantization coefficient. Further, block pulses are supplied to the multiplexer 11, the DCT circuit 13, the quantizer 15, etc. which operate in units of blocks.

The quantized data from the quantizer 15 is applied to a variable length encoder 16 and is, for instance, encoded into Huffman codes based on the result calculated from the statistical encoding quantity of the quantized output. As a result, a short time sequence of bits is assigned to data having a high appearance probability and a long time sequence of bits to data having a low appearance probability and thus, transmission quantity is further reduced. The output of the variable length encoder 16 is applied to an error correction encoder 17, which provides the output from the variable length encoder 16 with error correction parity and outputs the resultant data to a multiplexer 19.

The output of the variable length encoder 16 is also applied to an encoding controller 18. The amount of the output data varies largely depending on input picture. So, the encoding controller 18 monitors the amount of the output data from the variable length encoder 16 and regulates the amount of the output data by controlling the quantization coefficient of the quantizer 15. Further, the encoding controller 18 may restrict the amount of the output data by controlling the variable length encoder 16.

A sync/ID generator 20 generates a frame sync signal and ID signal showing data contents and additional information and provides them to the multiplexer 19. The multiplexer 19 forms one sync block of data with a sync signal, an ID signal, a compressed data signal and a parity bit and provides this data to a recording encoder (not shown). The recording encoder, after recording/encoding the output from the multiplexer 19 according to the characteristics of a recording medium, records the encoded data on the recording medium (not shown).

On the other hand, if the switch 14 is ON, the current frame signal from the multiplexer 11 is subtracted from the motion compensated preceding frame data, which will be described later, in the subtracter 12 and applied to the DCT circuit 13. That is, in this case the inter-frame encoding is carried out to encode differential data using a redundant inter-frame image. When a difference between the preceding frame and the current frame is simply obtained in the inter-frame encoding, it will become large if there is any motion in the picture. So, the difference is minimized by compensating the motion by obtaining a difference at the pixel location corresponding to the motion vector while detecting the motion vector by obtaining the location of the preceding frame corresponding to the prescribed location of the current frame.

The output of the quantizer 15 is also applied to an inverse quantizer 21. This quantized output is inverse-quantized in the inverse quantizer 21 and further, inverse DCT processed in an inverse DCT circuit 22 and restored to the original video signal. Further, the original information cannot be restored completely through the DCT processing, requantization, inverse quantization and inverse DCT processing. In this case, as the output of the subtracter 21 is differential information, the output of the inverse DCT circuit 22 is also differential information. The output of the inverse DCT circuit 22 is applied to an adder 23. This output from the adder 23 is fed back through a variable delay circuit 24, which delays signals by about one frame period, and a motion compensator 25. The adder 23 reproduces the current frame data by adding differential data to the preceding frame data and provides them to the variable delay circuit 24.

The preceding frame data from the variable delay circuit 24 and the current frame data from the multiplexer 11 are applied to a motion detector 26 where the motion vector is detected. The motion detector 26 obtains the motion vector through a full search motion detection by, for instance, a matching calculation. In the full search type motion detection, a current frame is divided into the prescribed number of blocks and the search range of, for instance, 15 horizontal pixels×8 vertical pixels is set for each block. In the search range corresponding to the preceding frame, the matching calculation is carried out for each block and an inter-pattern approximation is calculated. Then the motion vector is obtained by calculating the preceding frame block which provides the minimum distortion in the search range. The motion detector 26 provides the motion vector thus obtained to the motion compensator 25.

The motion compensator 25 extracts a corresponding block of data from the variable delay circuit 24, compensates it according to the motion vector and provides it to the subtracter 12 through the switch 14 and also, to the adder 23 after making the time adjustment. Thus, the motion compensated preceding frame data is supplied from the motion compensator 25 to the subtracter 12 through the switch 14. When the switch 14 is ON, the inter-frame compression mode is actuated and when the switch 14 is OFF, the intra-frame compression mode is actuated.

The switch 14 is turned ON/OFF based on a motion signal. That is, the motion detector 26 generates the motion signal depending on whether the motion vector size is in excess of a prescribed threshold value and outputs it to a logic circuit 27. The logic circuit 27 controls the ON/OFF of the switch 14 by the logical judgment using the motion signal and a refresh periodic signal. The refresh periodic signal is a signal showing the intra-frame compression processed frame I shown in FIG. 5. If the input of the intra-frame compression processed frame is represented by the refresh periodic signal, the logic circuit 27 turns the switch 14 OFF irrespective of the motion signal. Further, if the motion signal represents that the motion is relatively fast and the minimum distortion by the matching calculation exceeds the threshold value, the logic circuit 27 turns the switch 14 OFF and the intra-frame encoding is carried out for each block even when the inter-frame compression processed frame P data are input. Table 2 shown below represents the ON/OFF control of the switch 14 by the logic circuit 27.

TABLE 2

| Frame I | Intra-Frame Compression Processed Frame | Switch 14 OFF |
|---|---|---|
| Frame P | Motion Vector Detected Inter-Frame Compression Processed Frame | Switch 14 ON |
| | Motion Vector Unknown Inter-Frame Compression Processed Frame | Switch 14 OFF |

FIG. 8 is an explanatory diagram showing the data stream of record signals which are output from the multiplexer 19.

As shown in FIG. 8, the first and the sixth frames of the input video signal are converted to intra-frames I1 and I6, respectively, while the second through the fifth frames are converted to inter-frame compression processed frames P2 through P5. The ratio of data quantity between the intra-frame compression processed frame I and the inter-frame compression processed frame P is (3–10) :1. The amount of data of the intra-frame compression processed frame I is relatively large, while the amount of data of the inter-frame compression processed frame P is extremely reduced. Further, the data of the inter-frame compression processed frame P cannot be decoded unless other frame data are decoded.

FIG. 9 is a block diagram illustrating the decoding section (playback section) of a conventional variable length code recording/playback apparatus.

Compressed encoded data recorded on a recording medium is played back by the playback head (not shown) and then input into an error correction decoder 31. The error correction decoder 31 corrects errors produced in the data transmission and the data recording. The playback data from the error correction decoder 31 is applied to a variable length data decoder 33 through a code buffer memory 32 and decoded to a prescribed length data. Further, the code buffer memory 32 may be omitted.

The output from the variable length decoder 33 is inverse-quantized in an inverse quantizer 34, and then decoded by an inverse-DCT operation in an inverse DCT circuit 35. The decoded data is then applied to the terminal a of a switch 36. The the output of the variable length decoder 33 is also applied to a header signal extractor 37. The header signal extractor 37 retrieves a header showing whether the input data is the intra-frame compression data (intra-frame data) or the inter-frame compression data (inter-frame data) and then provides the header to the switch 36. When supplied with the header showing the intra-frame compression data, the switch 36 selects the terminal a of the switch 36 and thus outputs decoded data from the inverse DCT circuit 35.

The inter-frame compression data is obtained by adding the output from the inverse DCT circuit 35 and the preceding frame output from a predictive decoder 39 using an adder 38. That is, the output of the variable length decoder 33 is applied to a motion vector extractor 40 for obtaining a motion vector. This motion vector is applied to the predictive decoder 39. The decoded output from the switch 36 is delayed for one frame period by a frame memory 41. The predictive decoder 39 compensates the preceding frame decoded data from the frame memory 41 according to the motion vector and provides them to the adder 38. The adder 38 outputs inter-frame compression data to the terminal b of the switch 36 by adding the output from the predictive decoder 39 and the output from the inverse DCT circuit 35. When the inter-frame compression data is applied, the switch 36 selects the terminal b by the header and thus outputs the decoded data from the adder 38. Accordingly, the compression and expansion are carried out without delay in both of the intra-frame compression mode and the inter-frame compression mode.

However, the intra-frame compression processed frame I and the inter-frame compression processed frame P differ each other in their encoded quantities. If the data stream shown in FIG. 8 is recorded on a recording medium, one frame is not necessarily able to playback at the triple-speed mode playback. Further, the interframe compression processed frame P processed by the inter-frame compression will not be able to be played back when any undecoded frame is generated as in the triple-speed mode playback because inter-frame compression processed frame P cannot be decoded as an independent frame.

To solve the above problems, the applicant of the present application has proposed a method to arrange important data by concentrating them as in the Japanese Patent Application (TOKU-GAN-HEI) P02-11745. FIGS. 10(a) through 10(c) are explanatory diagrams for explaining the method. FIG. 10(a) shows trace patterns at a triple-speed playback mode and a ninetimes speed mode playback. FIG. 10(b) shows the recorded state on a tape at the triple-speed playback mode. And FIG. 10(c) shows the recorded state on a tape at the nine-times speed playback mode. In these diagrams, the hatched sections are the areas to be played back at the triple-speed playback mode and at the nine-times speed playback mode respectively (hereinafter referred to as the specific arrange areas).

In this proposal, important data are arranged in the hatched sections shown in FIG. 10(b) at the triple-speed playback mode, while important data are arranged in the hatched sections shown in FIG. 10(c) at the nine-times speed playback mode. These hatched sections are the areas which are played back at the triple-speed playback mode and the nine-times speed playback mode, respectively. Further, if the intra-frame data are adopted as important data, they are recorded not only in the specifically arranged area but also in other section (the meshed section).

FIGS. 11(a) through 11(e) are explanatory diagrams for explaining the video data.

Video data are compressed by the compression method presented by the MPEG (Moving Picture Experts Group). Further, for a video telephone/conference, 64 Kbps ×n times rate H.261 has been presented and also the still picture compression method has been presented by the MPEG. The MPEG is for semi-moving pictures so that the transmission rate is 1.2 Mbps as adopted for CD-ROM, etc. In the MPEG, data of the first frame, the second frame . . . shown in FIG. 11(a) are converted to the intra-frame I1, the inter-frame data B2, the inter-frame B3, the intra-frame data P4 . . . as shown in FIG. 11(b), respectively. Thus, the respective frame data are compressed at different compression rates.

Data shown in FIG. 11(b) are changed in order to facilitate decoding. That is, as the inter-frame B can be decoded by decoding the inter-frame P, of a recording on a recording medium, the data are supplied to a recording medium or a transmission line after they are changed in order of the intra-frame I1, the inter-frame P4, the inter-frame B2, the inter-frame B3 . . . and so on.

In a normal recording, the data shown in FIG. 11(c) are sequentially recorded on a recording medium. FIG. 11(d) shows the state of this recording. On the contrary, in this method, the data arrangement is changed as shown in FIG. 11(e) to make a specific speed playback mode possible. For instance, to make the triple-speed playback mode possible, the intra-frame I data are recorded by dividing into the leading end I1(1) of the first track #1, the center I1(2) of the second track #2 and the trailing end I1(3) of the third track #3. Thus, when the hatched sections shown in FIG. 10(b) are played back, the intraframe I data are played back.

FIG. 12 is a block diagram showing the construction of the proposed method. The same elements in FIG. 12 as those in FIG. 6 are assigned with the same reference numerals and their explanations are omitted.

A data sequence changer 101 changes the time sequence of input signals A1, B1 and C1 and outputs signals A2, B2 and C2 to a multiplexer 102. The data of the intra-frame I and the inter-frames P and B are given as the input signals A1, B1 and C1. These frame data are composed of the luminance signal Y and color difference signals Cr and Cb, and the multiplexer 102 multiplexes the signals Y, Cr and Cb in time sequence and outputs the multiplexed signal therefrom.

The output of a variable length encoder 16 is given to an address generator 53 and a data rearranger 100 shown by the broken-line block, in addition to a variable length controller 18. The data rearranger 100 is provided for recording important data (in this case, the intra-frame data) on the prescribed locations on a tape shown by the oblique lines in FIGS. 10(b) and 10(c). That is, the output of the variable length encoder 16 is separated into the intra-frame data and the inter-frame data, and the inter-frame data are controlled by a memory controller 54 and stored in an inter-frame data memory 52. The address generator 53 generates addresses showing the correspondence of the output of a variable length encoder 26 and the frame location, and an adder 51 adds the address to the intra-frame data from the variable length encoder 16. An intra-frame data memory 57 is controlled by a memory I controller 55 and stores the output of the adder 51. Further, the adder 51 may add an address to the inter-frame data.

The memory controller 54 and the memory I controller 55 are supplied with encoding process information from the variable length encoder 16, respectively, and control the write into the inter-frame data memory 52 and the intra-frame data memory 57. On the other hand, when reading from the data memories 52 and 57, the data rearrangement controller 56 rearranges data to obtain a data stream, as shown in FIG. 11(e), by controlling the memory controller 54, the memory I controller 55 and a multiplexer (hereinafter referred to as MPX) 58. That is, a track number counter 103 is given a track start signal, for instance, a head switching pulse directing the head switching, etc., and obtains the recording track number, and outputs it to the data rearrangement controller 56. For instance, when corresponding to the triple-speed mode playback, the track number counter 103 outputs track numbers #1, #2, and #3 indicating three types of continuous recording tracks in time sequence repeatedly. The data rearrangement controller 56 controls the arrangement of the intra-frame data out of the data from the MPX 58 based on the output from the track number counter 103. For instance, when making the triple-speed mode playback possible, if data indicating the track #1 is given, the data rearrangement controller 56 arranges the output from the intra-frame data memory 57 so as to record it on the leading end of the recording track. Similarly, if data indicating the tracks #2 and #3 are given, it arranges the outputs from the intraframe data memory 57 so as to record them at the center and the trailing end of the recording track.

Thus, the MPX 58, under the control of the data rearrangement controller 56, multiplexes the intra-frame data and outputs them to an error correction encoder 17. The error correction encoder 17 outputs the multiplexed intra-frame data with an error correction parity added to a multiplexer 19. A sync/ID generator 20 generates a sync signal and an ID signal and then outputs them to the multiplexer 19, which in turn outputs them by adding them to the output of the MPX 58. The output of the multiplexer 19 is recorded on a recording medium through the recording head (not shown).

On the other hand, FIG. 13 is a block diagram showing the playback section. The same elements in FIG. 13 as those in FIG. 9 are assigned with the same reference numerals and their explanations are omitted.

In the playback section, the same decoding operation as that in FIG. 9 is basically carried out. However, as data have been rearranged during the recording operation, a process to return the data to its original arrangement is added. That is, the playback output from a recording medium (not shown) is demodulated and the error correction is made in an error correction decoder 31 and is then output to an address and data length extractor 61 and a DMPX 62. As the intra-frame data is recorded on the prescribed locations on a recording medium according to a prescribed playback speed, it is possible to reproduce the intra-frame by performing the playback at the prescribed playback speed.

The address and data length extractor 61 extracts the address and computes the data length of the intra-frame data. The DMPX 62 is controlled based on the data length from the address and data length extractor 61 and separates the intra-frame data and the inter-frame data, and outputs them to variable length decoders 64 and 65, respectively. The variable length decoders 64 and 65 decode the data to prescribed length data and output them to an intra-frame buffer 66 and an inter-frame buffer 67, respectively.

Decoded data of the variable length decoders 64 and 65 are also output to a header extractor 63. The header extractor 63 is also supplied with the output from the address and data length extractor 61 and by generating a signal indicating the time series is to be restored, outputs it to a memory I controller 69, a memory controller 70 and an intra-frame data rearrangement canceller 68. The intra-frame data rearrangement canceller 68 controls the memory I controller 69, the memory controller 70 and an MPX 71 based on the indicating signal and the header information. Then, the memory I controller 69 and the memory controller 70 control the read/write of the intra-frame buffer 66 and the inter-frame buffer 67, respectively, and then output the intra-frame and the inter-frame data converted to prescribed length data to the MPX 71. The MPX 71 restores the data sequence to the original data sequence before the rearrangement operation and then outputs the data sequence to a circuit block 300 encircled with the broken line. The operation in the block 300 is the same as the process after the reverse quantization process and the decoded output is output from a switch 36.

FIG. 14 is an explanatory diagram for explaining one example of data to be recorded in the specific arrangement area. Further, FIG. 15 shows the correspondence of the data with the pictures as shown in FIG. 14, and FIGS. 16(a) and 16(b) show a data stream when the data, as shown in FIG. 14, are encoded efficiently.

As shown by the hatched sections in FIG. 14, the intra-frame I is divided into five sections and these divided frame sections I1 through I5 are arranged in the prescribed area of the inter-frame P. Data I1 through I5 correspond to each one of five vertically divided sections, respectively. Now, dividing a frame into two sections vertically and five sections horizontally, the upper areas are assumed to be a(f), b(g), c(h), d(i) and e(j), the lower areas to be a'(f'), b'(g'), c'(h'), d'(i') and e'(j'), and the ten frames are assumed to be one set. Then, as shown in FIG. 15, the data I1 corresponds to the areas a and a', and the data I2 corresponds to the areas b and b'. Similarly, the data I3 through I10 correspond to the areas c, c' through j, j' on the frame, respectively.

In the first frame, the data I1 of the intra-frame I and the data P1 of the inter-frame P are arranged, while in the second frame the data I2 of the intra-frame I is arranged between the respective inter-frames P2. Similarly, in the third and the fourth frames, the data I3 and I4 of the intra-frame I are arranged between the inter-frames P3 and P4, respectively. Similarly in the fifth frame, the inter-frame P5 and the intra-frame I5 are arranged.

When these data are high efficiency encoded, as shown in FIGS. 16(a) and 16(b), each of the frames is composed of a DC component and an AC component of the intra-frame data and the inter-frame data. Further, the data stream is rearranged so that the intra-frame data are recorded in a specifically arranged area on a recording medium.

Now, when a five-times speed playback mode is possible, a specifically arranged area will be arranged as shown by the hatched sections in FIG. 17. If one frame data is to be recorded on two tracks, the intra-frame data I1 is recorded in the specifically arranged areas of the first and the second tracks. That is, as shown in FIG. 17, the data corresponding to the areas a, a', b, b', c, c', d, d'. . . of the frame are recorded, respectively.

Therefore, at the five-times speed playback mode, the data corresponding to the frame areas a, a', b, b', c, c'. . . are played back successively and one frame is constructed by two tracings, as shown in FIG. 18(a). In the next two tracings, the data corresponding to the frame areas f, f', g, g', . . . j, j' are played back successively to form n frames, as shown in FIG. 18(b). In the next two tracings, one frame is constructed by the data corresponding to the frame areas a, a', . . . e, e', as shown in FIG. 18(c).

As described above, the playback section shown in FIGS. 12 and 13 obtains a playback image by playing back at least intra-frame data at a specific speed playback. However, there was a problem in that good quality playback pictures couldn't be obtained in reverse direction playbacks. FIGS. 19 and 20 are explanatory diagrams for explaining the problem. FIGS. 19(a), 19(b) and 19(c) show constructions of frames played back at a double-speed playback mode, while and FIGS. 20(a), 20(b) and 20(c) show constructions of frames played back at a five-times speed mode playback.

As shown in FIGS. 19(a), 19(b) and 19(c), at the double-speed playback the data recorded on two tracks are played back by one tracing and therefore, only one of two adjacent tracks is played back. For instance, as shown by the oblique lines in FIG. 19(a), if the data corresponding to the frame area a is first played back, the data corresponding to the area b is played back in the next tracing. Therefore, in the next five tracings only data in the areas a through e corresponding to the upper portion of the frame are played back. Further, in the next five tracings only data in the areas f through j corresponding to the upper portion of the frame are played back as shown in FIG. 19(b) and in the next five tracings only data in the areas a through c are played back, as shown in FIG. 19(c).

Further, if a reverse direction five-times speed playback will be executed, the tracing direction of the magnetic head is as shown by the broken line in FIG. 17 and the playback is carried out in the order reverse to that at the time of recording. For instance, when the data corresponding to the area i' is played back in the first tracing, the data corresponding to the area b is played back in the next tracing. That is, as shown by the oblique lines in FIG. 20(a), only data in the frame areas g and i' are played back in two tracings. Further, in the next two tracings, as shown in FIG. 20(b), only data corresponding to the areas d' and b are played back and in the next two tracings, as shown in FIG. 20(c), only data corresponding to the areas i' and g are played back. Thus, there was the problem in that at the playbacks other than the normal speed playback and the five-times speed playback, only part of the frame was played back and no good quality playback image could be obtained.

Thus, conventional variable length code recording/ playback apparatus, as described above had a problem when intra-frame data were rearranged according to a prescribed speed playback mode the picture quality at a prescribed high speed forward direction playback mode was guaranteed but no good quality specialized playback picture could be obtained in the playbacks at other speeds and in the reverse direction.

SUMMARY OF THE INVENTION

It is, therefore, an object of the present invention to provide a variable length code recording/playback apparatus which is capable of improving picture quality in a reverse direction playback as well as a plurality of the specific speed playback modes.

In order to achieve the above object, a variable length code recording/playback apparatus according to one aspect of the present invention, is provided which encodes intra-frame data and inter-frame data in variable length code, records them as recorded codes on prescribed locations of tracks of a recording medium and plays them back, which includes a data rearranger for recording the data in areas to be played back in at least two specific speed playback modes on the tracks by rearranging prescribed data out of the data encoded in variable length code, a variable length decoder for playing back the data recorded on the recording medium and decoding it from variable length code, a restorer for controlling and restoring the time series of the output of the variable length decoder to the original data train before the rearrangement, and a decoder for constructing a playback image from the decoded outputs for several frames in the specific speed playback mode by decoding the output of this data restorer.

Additional objects and advantages of the present invention will be apparent to persons skilled in the art from a study of the following description and the accompanying drawings, which are hereby incorporated in and constitute a part of this specification.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIG. 3 an explanatory diagram showing the construction of the recording/playback heads;

FIGS. 4(a) and 4(b) are explanatory diagrams for explaining the construction of the playback frame of the prior art;

FIG. 5 is an explanatory diagram for explaining the compression method according to H.261 recommendation;

FIGS. 11(a) through 11(e) are explanatory diagrams for explaining the data arrangement in the conventional example shown in FIGS. 10(a) through 10(c);

FIG. 14 is an explanatory diagram for explaining data to be recorded in specifically arranged areas;

FIG. 15 an explanatory diagram showing correspondence between data and frame in FIG. 14;

FIGS. 16(a) and 16(b) are explanatory diagrams for explaining the data stream shown in FIG. 14;

FIG. 17 is an explanatory diagram for explaining the recording state corresponding to the five-times speed playback mode in the conventional examples in FIGS. 12 and 13;

FIGS. 18(a) through 18(c) are explanatory diagrams for explaining the operations according to the prior art;

FIGS. 19(a) through 19(c) are explanatory diagrams for explaining problems according to the prior art;

FIGS. 20(a) through 20(c) are explanatory diagrams for explaining problems according to the prior art;

FIG. 23 is an explanatory diagram for explaining the data arrangement according to the first embodiment;

FIGS. 24(a) through 24(c) are explanatory diagrams for explaining the operation of the apparatus according to the first embodiment:

FIGS. 25(a) through 25(c) are explanatory diagrams for explaining the operation of the apparatus according to the first embodiment;

FIGS. 26(a) through 26(c) are explanatory diagrams for explaining the operation of the apparatus according to the first embodiment;

FIG. 32 is a block diagram showing a modification of the second embodiment of the present invention;

FIG. 39 is an explanatory diagram for explaining the operation of the modification of the recording section of the apparatus according to the third embodiment;

FIG. 40 is block diagram showing a modification of the playback section of the recording/playback apparatus according to the third embodiment;

FIGS. 41(a) and 41(b) are explanatory diagrams for explaining the operation of the modification of the playback section of the apparatus according to the third embodiment;

DESCRIPTION OF THE PREFERRED EMBODIMENTS

Figure 1A:
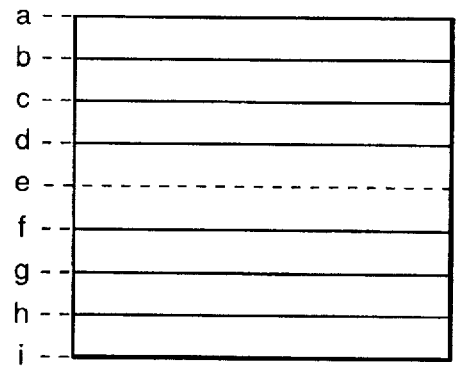
FIGS. 1(a) and 1(b) are explanatory diagrams for explaining the correspondence of the locations on the frame with the locations on a recording medium of the prior art.
Figure 1B:
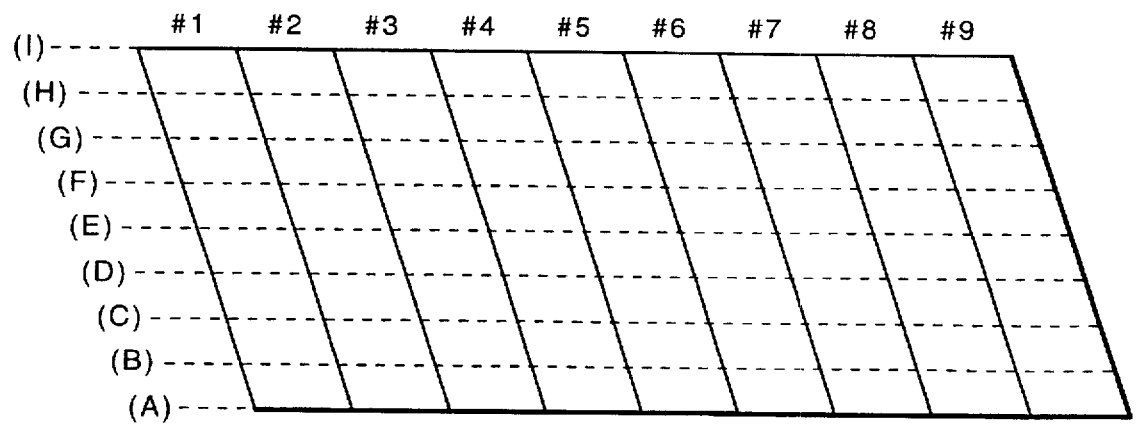
Figure 2A:
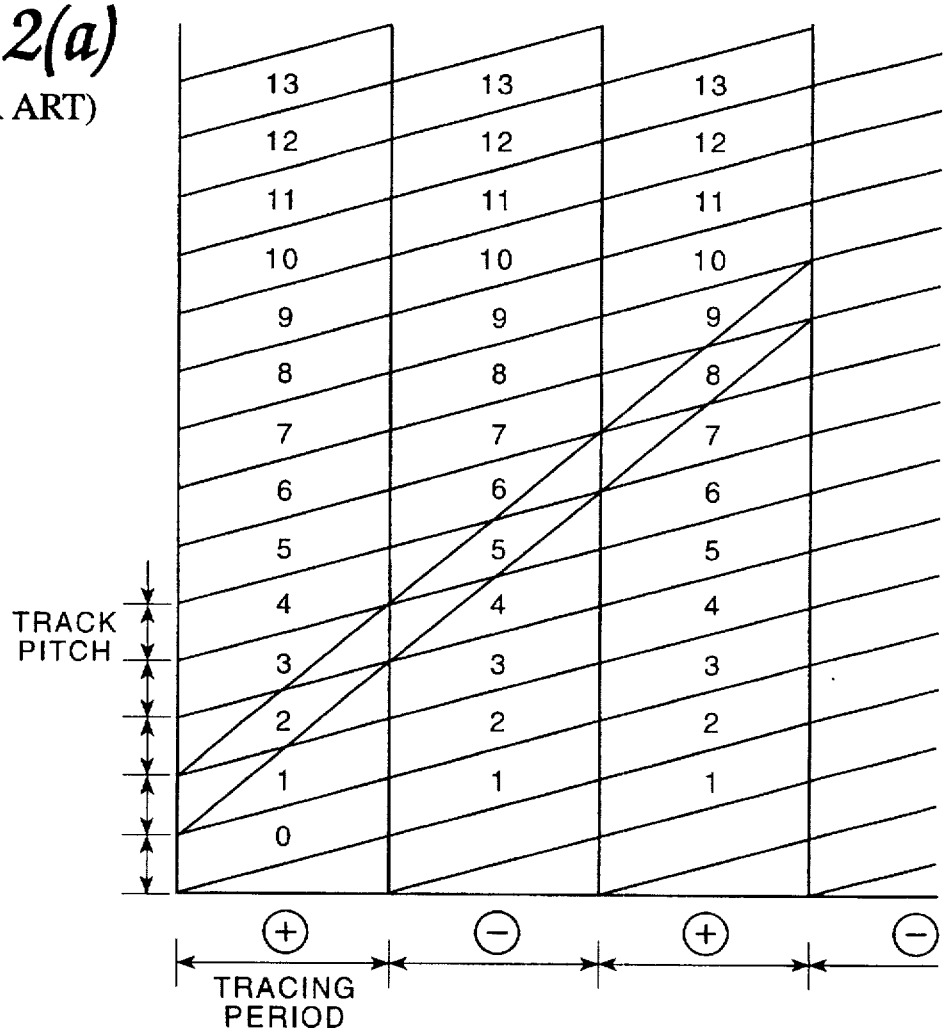
FIGS. 2(a) through 2(d) are explanatory diagrams showing the relationship between the tracing pattern and the playback envelope at triple-speed playback mode.
Figure 2B:
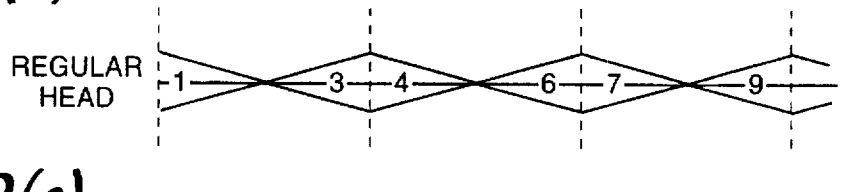
Figure 2C:
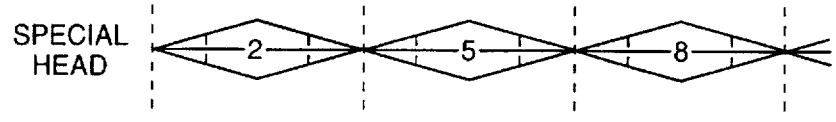
Figure 2D:
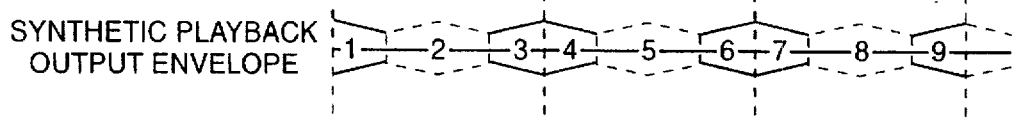
Figure 6:
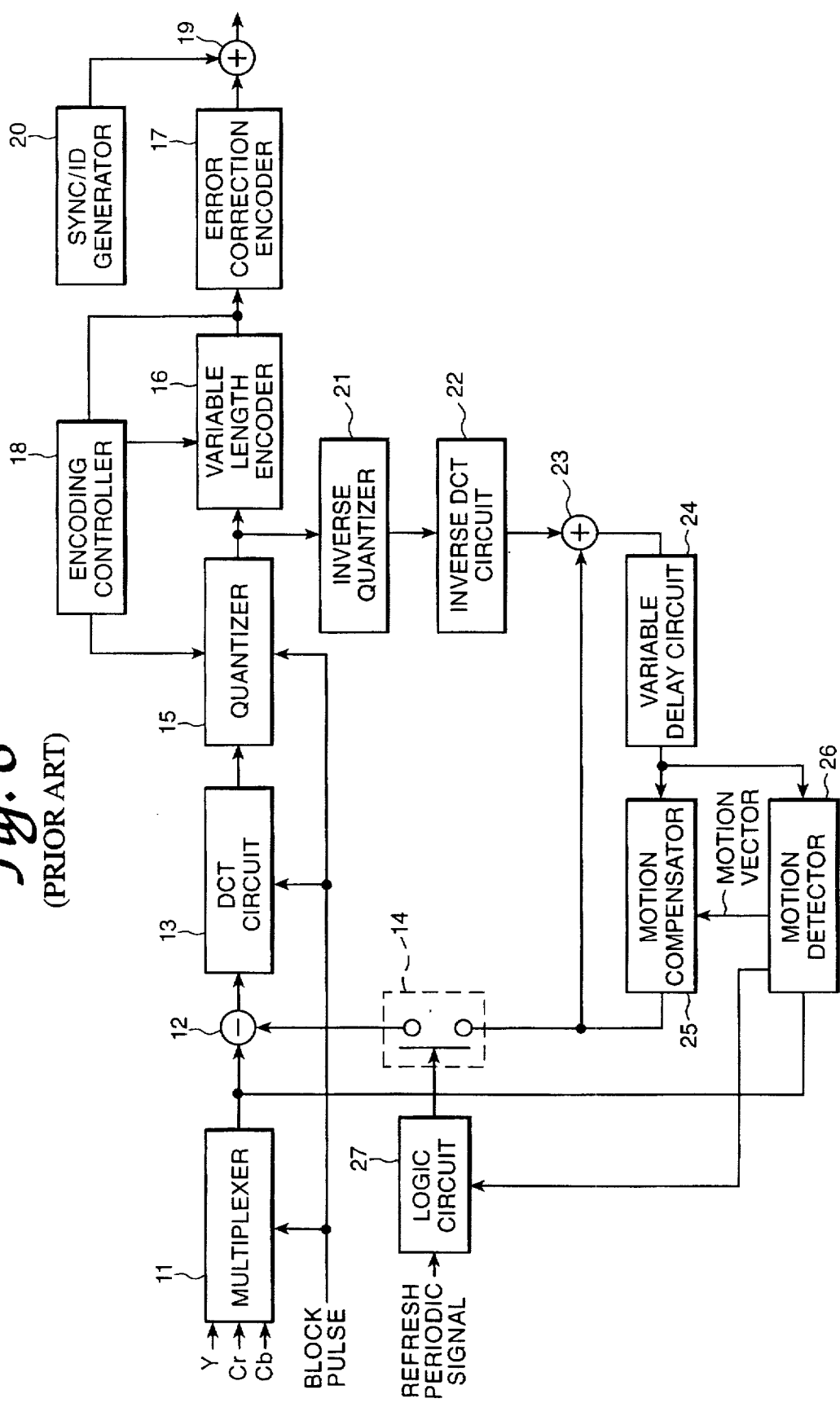
FIG. 6 is a block diagram showing the recording section of conventional variable length code recording/playback apparatus adopting the predictive encoding.
Figure 7:
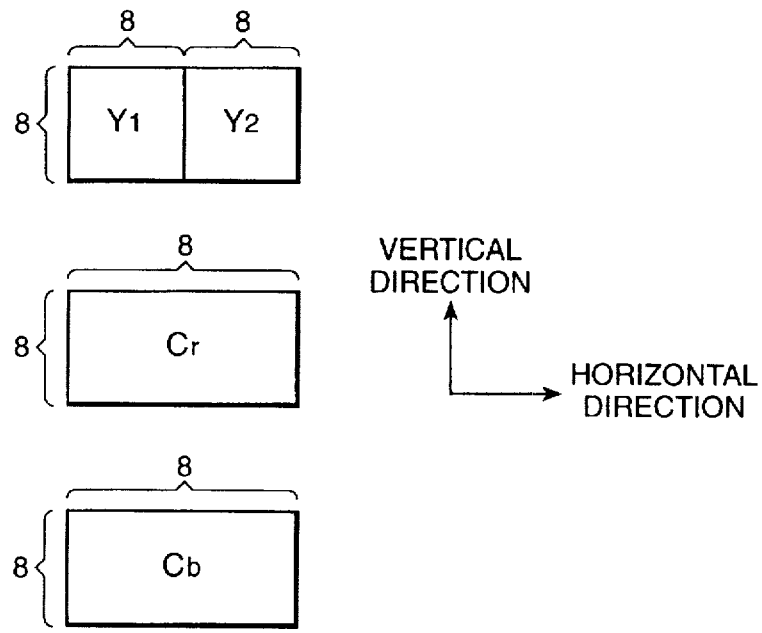
FIG. 7 is an explanatory diagram for explaining the macro block.
Figure 8:
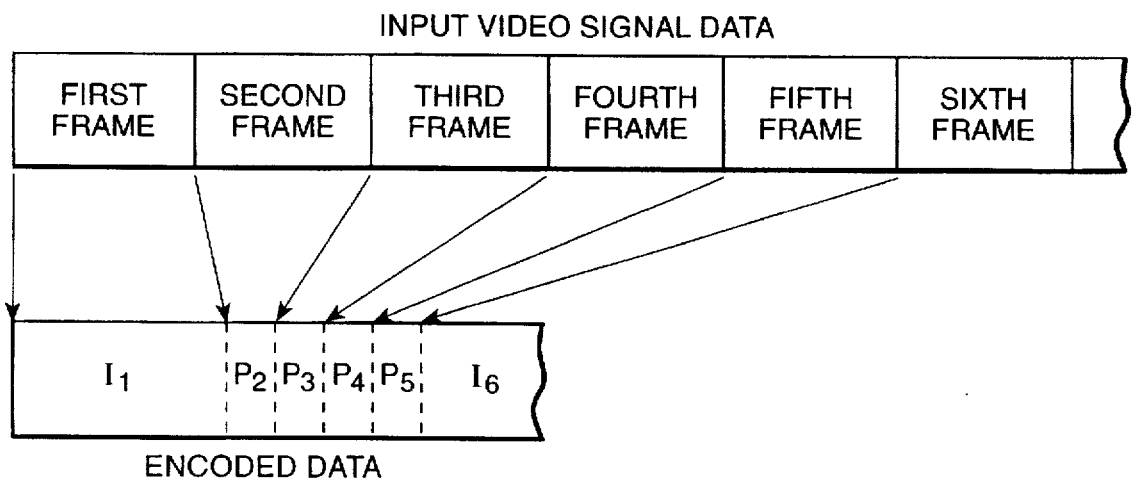
FIG. 8 is an explanatory diagram showing the data stream of recorded signals in the recorder shown in FIG. 6.

The present invention will be described in detail with reference to the FIGS. 21 through 54. Throughout the drawings, reference numerals or letters used in FIGS. 1(a) through 20 will be used to designate like or equivalent elements for simplicity of explanation.

Figure 12A:
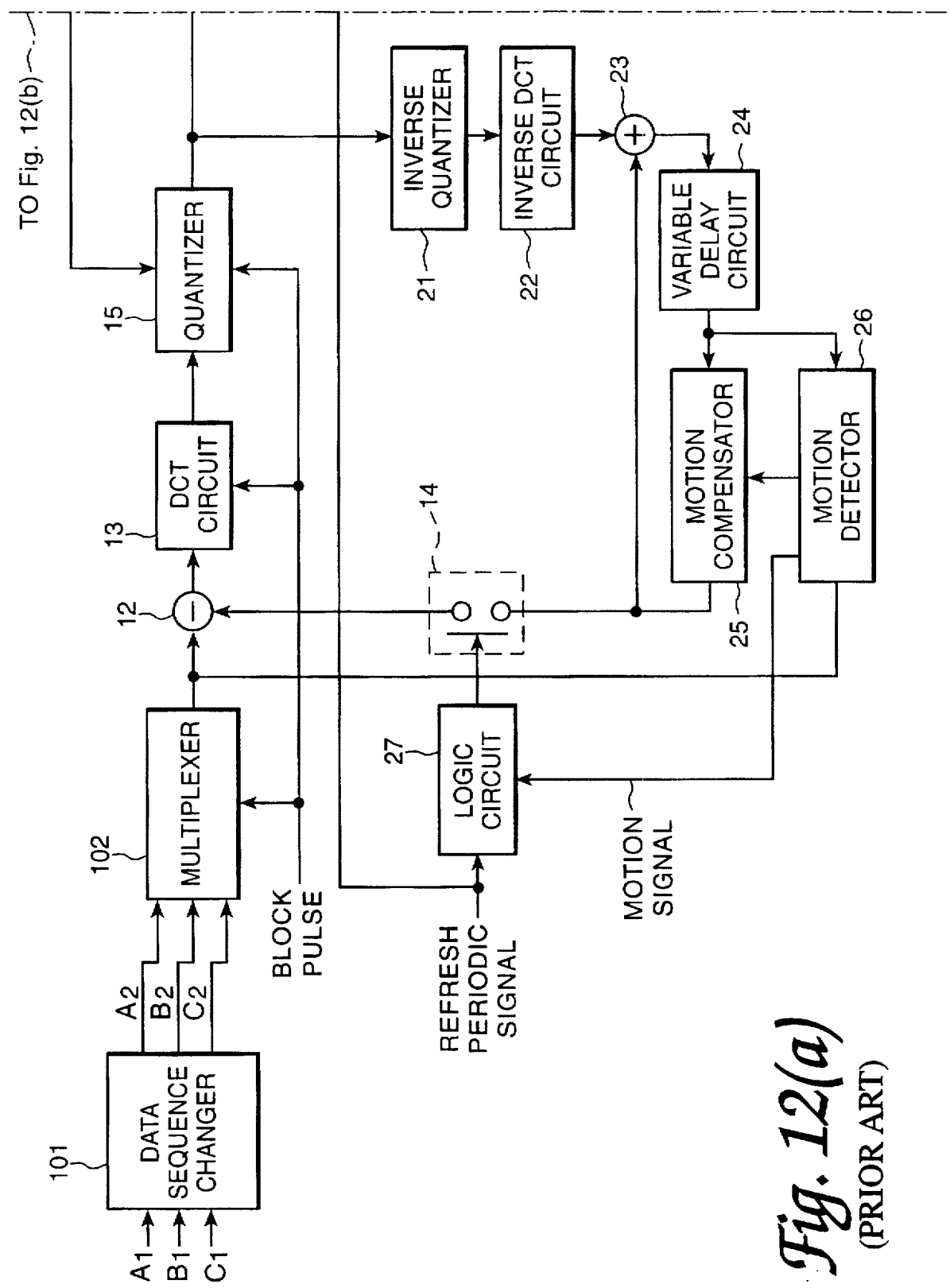
FIG. 12 is a block diagram showing the recording section of the conventional variable length code recording/playback apparatus realizing FIGS. 10(a) through 10(c)
Figure 12B:
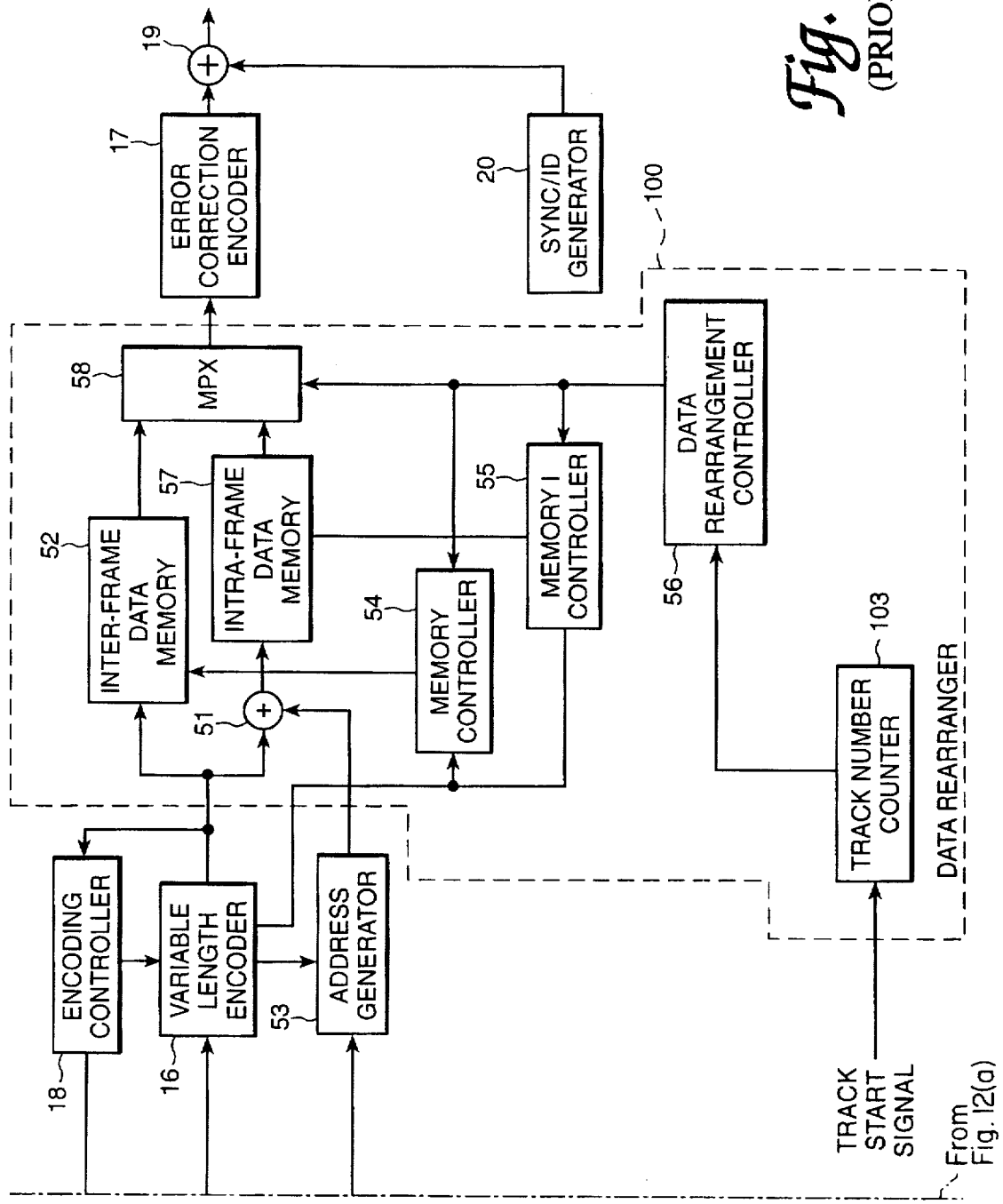
Figure 13A:
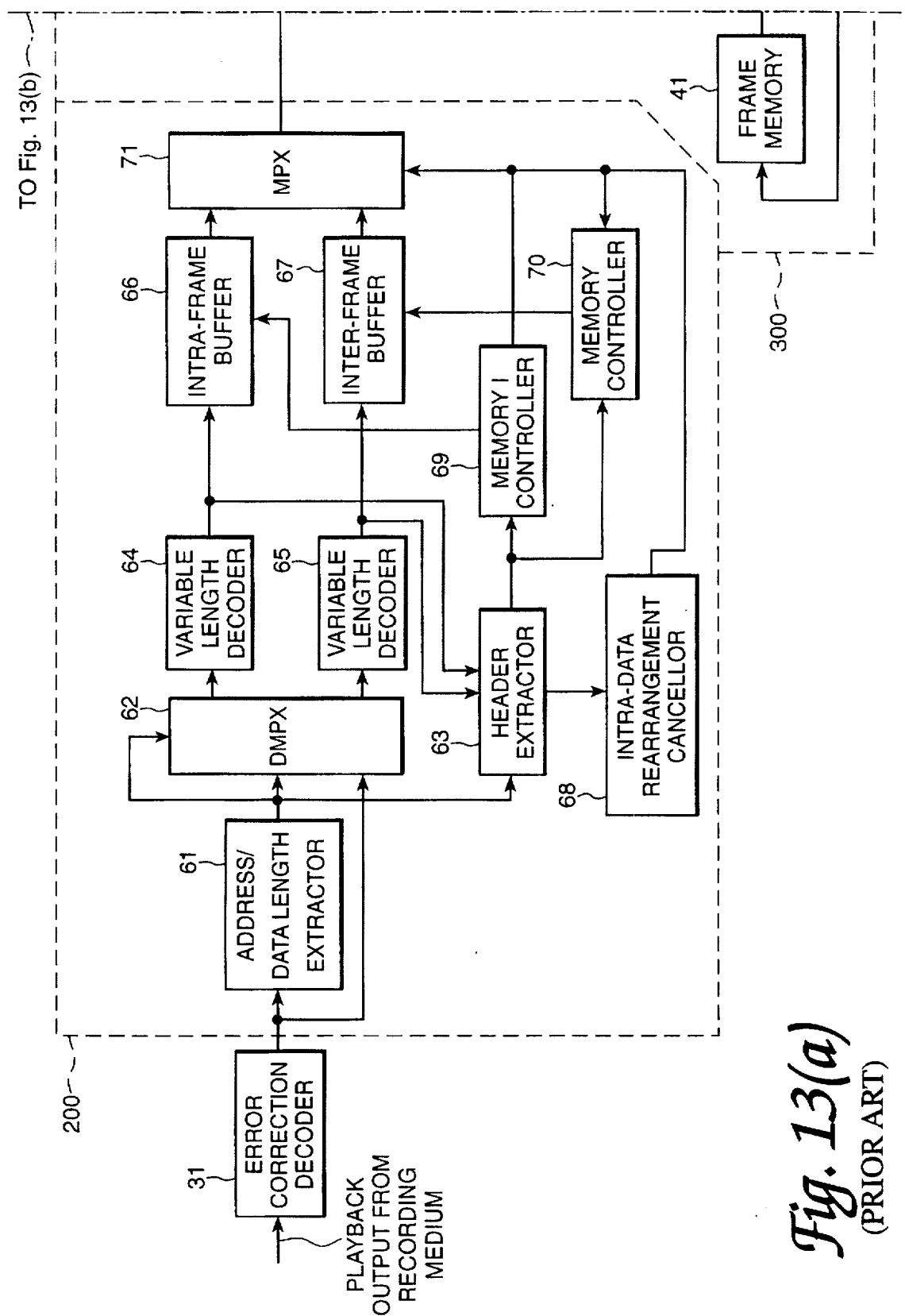
FIG. 13 is a block diagram showing the playback section of the conventional variable length code recording/playback apparatus realizing FIGS. 10(a) through 10(c)
Figure 13B:
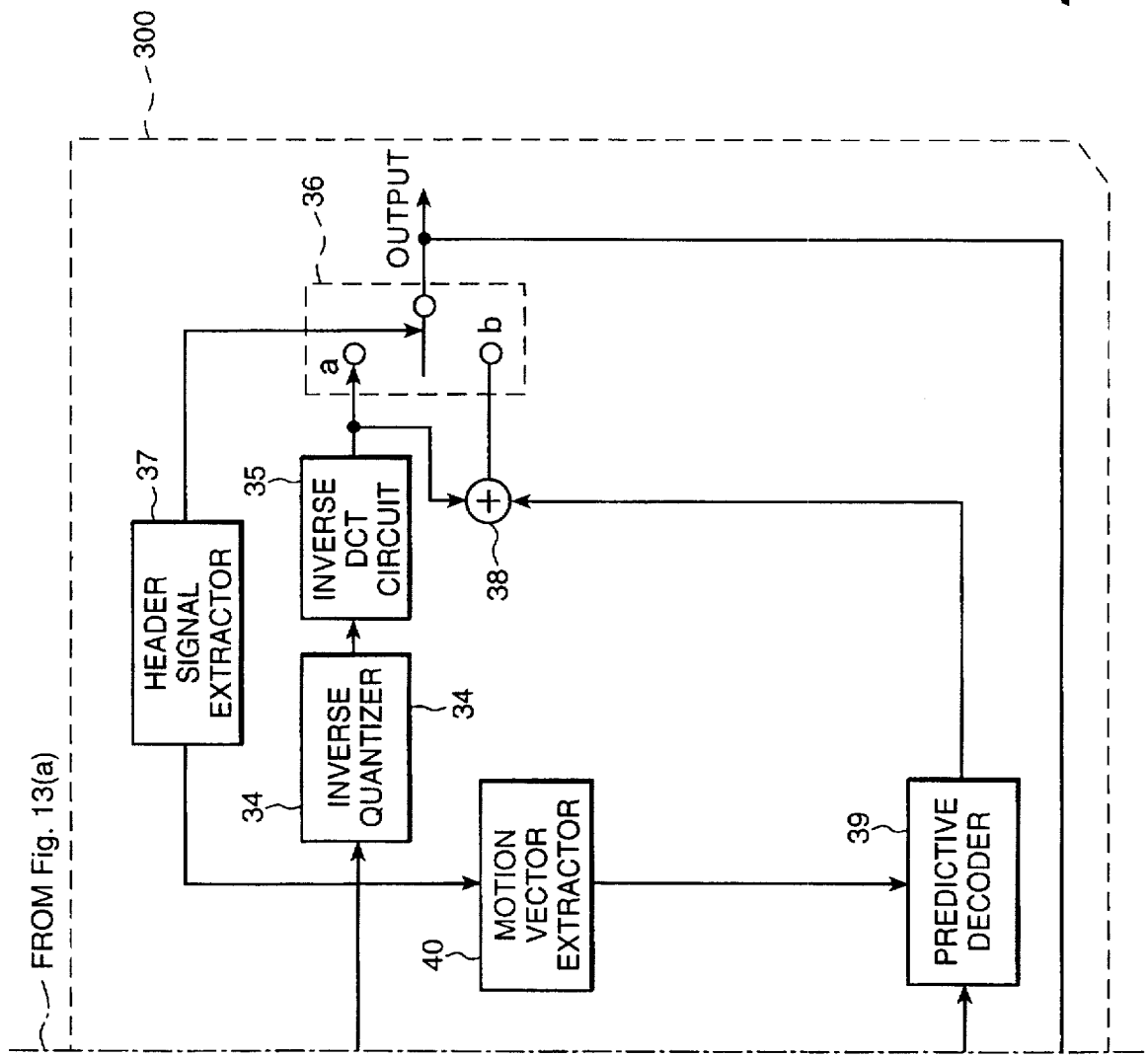
Figure 21B:
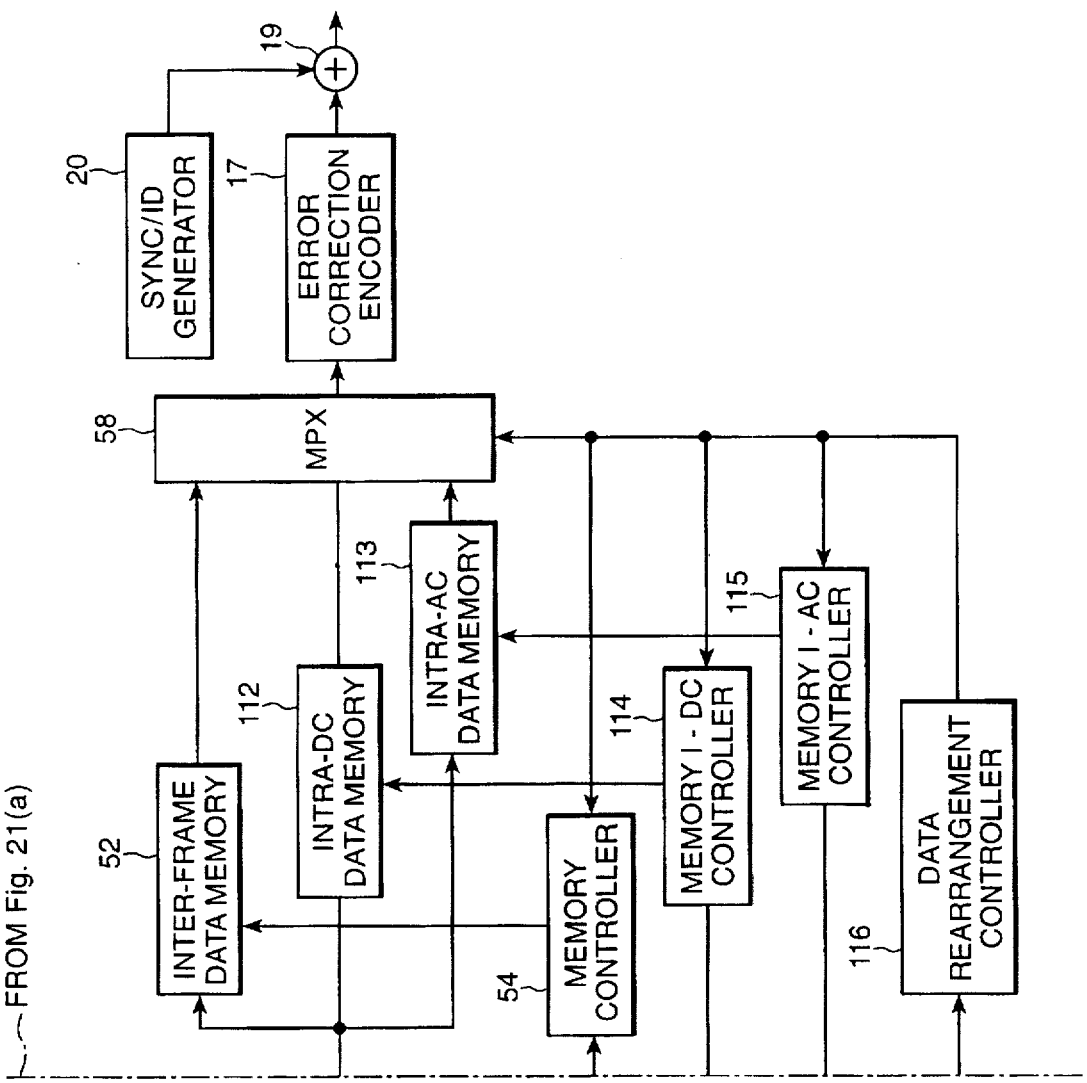
FIG. 21 is a block diagram showing a recording section of the variable length code recording/playback apparatus according to a first embodiment of the present invention.
Figure 22A:
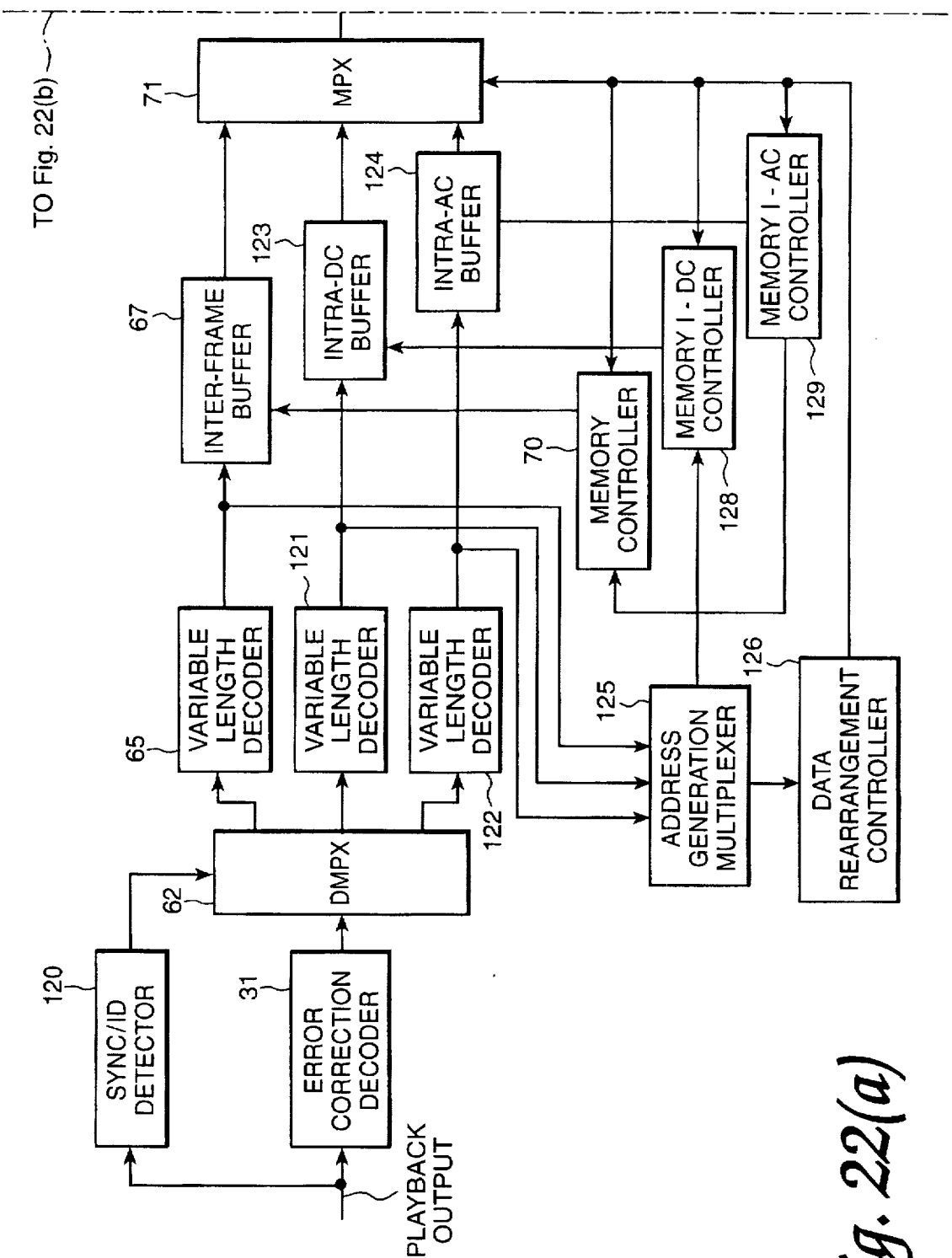
FIG. 22 is a block diagram showing a playback section of the variable length code recording/playback apparatus according to the first embodiment of the present invention.
Figure 22B:
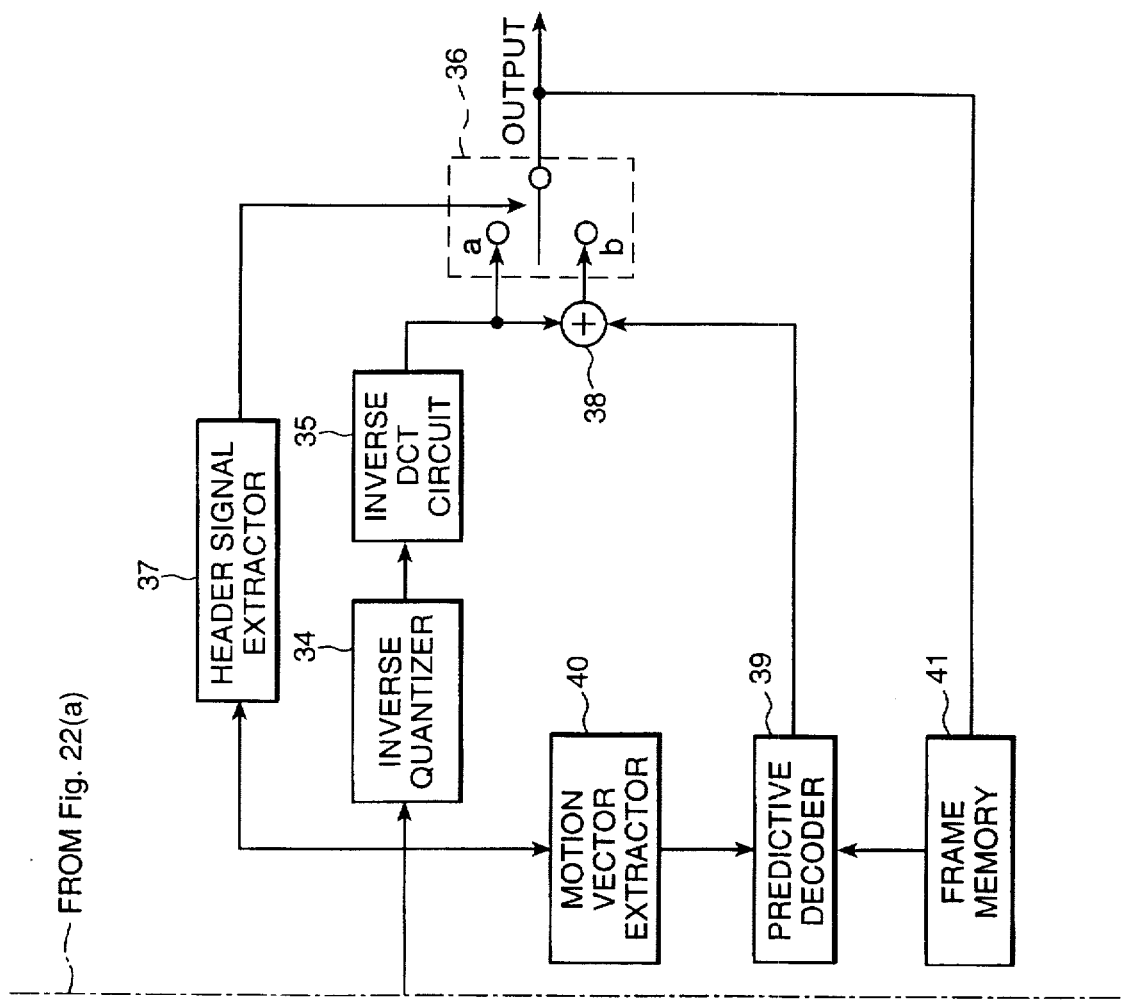

Referring now to FIGS. 21 through 26, a first embodiment of the present invention embodying a variable length code recording/playback apparatus will be described in detail. FIG. 21 is a block diagram showing the recording section (encoding section) of the embodiment. FIG. 22 is a block diagram showing the playback section (decoding section) of the embodiment. In FIGS. 21 and 22, the same elements as in FIGS. 12 and 13 are assigned with the same reference numerals. This embodiment is a recording/playback apparatus which performs the intra-frame compression for each frame.

In FIG. 21, a luminance signal Y and color difference signals Cr and Cb are applied to a multiplexer 11. The multiplexer 11 multiplexes the input signals in units of 8 pixels×8 horizontal tracing lines per block and also, multiplexes the blocks in units of macro blocks consisting of two luminance signal blocks Y and each of the color difference signal blocks Cr and Cb, and outputs a multiplexed signal to a subtracter 12. During the inter-frame compression process, the subtracts 12 subtracts the preceding frame data input through switch 14, from the output of the multiplexer 11 and outputs the resulting signal to a DCT circuit 13. At all other times the subtracter 12 outputs the output of the multiplexer 11 directly to the DCT circuit 13.

The DCT circuit 13 outputs the output of the subtracter 12 to a quantizer 15 after it undergoes the 8×8 two dimensional DCT process. The quantization coefficient of the quantizer 15 is controlled by an encoding controller 18. The quantizer 15 quantizes the output of the DCT circuit 13 using the quantization coefficient to lower the bit rate and outputs the quantized data to a variable length encoder 16. The variable length encoder 16 is controlled by the encoding controller 18, and converts the input data to variable length codes to further lower the bit rate, and then outputs the variable length encoded data to an inter-frame data memory 52, an intra-frame DC data memory 112 and an intra-frame AC data memory 113. The variable length encoder 16 also generates an MB signal for each macro block and outputs it to an address generation multiplexer 111. The encoding controller 18 changes the quantization coefficient based on the output from the variable length encoder 16 and also, restricts total code quantity by restricting the number of bits of output from the variable length encoder 16. Further, block pulses are supplied to circuits which perform the processing in units of block, such as the multiplexer 11, the DCT circuit 13, the quantizer 15, etc.

The output of the quantizer 15 is applied to a inverse quantizer 21. The inverse quantizer 21 executes a reverse quantization on the output from the quantizer 15 and outputs the resultant data to an inverse DCT circuit 22, which in turn restores the received output from the quantizer 15 to the data before the DCT processing and outputs the restored data to an adder 23. The adder 23 restores the data to the original data by adding the current frame difference data and the preceding frame data before the differential processing and then outputs the restored data to the variable delay circuit 24. The output of the variable delay circuit 24 is applied to a motion compensator 25 and a motion detector 26.

The output of the multiplexer 11 is also input to the motion detector 26, which, for instance, obtains the motion vector by the matching calculation through the full search motion vector detection, and outputs it to the motion compensator 25 and also outputs a motion signal based on whether a distortion value obtained from the matching calculation is in excess of a prescribed threshold value to a motion logic circuit 27. The motion compensator 25 compensates the output of the variable delay circuit 24 based on the motion vector, and outputs the motion compensated preceding frame data to the subtracter 12 through the switch 14. The motion logic circuit 27 controls the ON/OFF of the switch 14 based on the motion signal and a refresh periodic signal indicating the intra-frame.

The refresh periodic signal is also applied to the address generation multiplexer 111. Supplied with the refresh periodic signal indicating the intra-frame I and MB signal, the address generation multiplexer 111 generates an address for each MB signal in the intra-frame I and measures the data length between the MB signals.

The intra-frame DC data memory 112 stores DC components of the intra-frame data and the intra-frame AC data memory 113 stores AC components of the intra-frame data and outputs these components to an MPX 58. Further, the inter-frame data memory 52 stores the inter-frame data from the variable length encoder 16 and outputs the data to the MPX 58. A memory controller 54, a memory I-DC controller 114 and a memory I-AC controller 115 control the writing to the interframe data memory 52, the intra-frame DC data memory 112 and the intra-frame AC data memory 113 based on the data from the address generation multiplexer 111. The output of the address generation multiplexer 111 is also applied to a data rearrangement controller 116, which rearranges the data stream by controlling the memory controller 54, the memory I-DC controller 114, the memory I-AC controller 115 and the MPX 58.

FIG. 23 is an explanatory diagram for explaining the arrangement of the DC components of the intra-frame data out of the data stream in this embodiment by comparing them with the record locations on tracks. The data volume of the intra-frame data is much larger than the data volume of the inter-frame data. For instance, it is practically impossible to record all the intra-frame data in the specific arrangement areas at the five-times speed playback mode. For this reason, in this embodiment only the DC components of the intra-frame data are recorded in the specific arrangement areas. Further, one frame data is recorded on two tracks.

In this embodiment, in the same manner as before, the DC components of the intra-frame are divided into ten sections corresponding to the five-times speed playback mode. The divided DC components correspond to the locations on the frame. That is, when the frame is divided into two parts vertically and five parts horizontally, and the upper areas are assumed to be a(f), b(g), c(h), d(i) and e(j), and the lower areas to be a'(f'), b'(g'), c'(h'), d'(i'), and e'(j'), the first DC component corresponds to the area a and the second DC component corresponds to the area a'.

In this embodiment, as shown by the oblique lines in FIG. 23, the DC components of the intra-frame data corresponding to the area a are so arranged that they are recorded on the lowest end of the leading record track and the DC components corresponding to the area a' are so arranged that they are recorded on the top end of the leading record track. The DC components of the intra-frame data are not recorded in the next recording track. The DC Components corresponding to the areas b and b' are so arranged that they are recorded on the center of the third recording track and no DC component is recorded on the fourth recording track. The data corresponding to the area c are so arranged that they are recorded on the top end of the fifth recording track, and the data corresponding to the area c' are so arranged that they are recorded on the lowest end.

Therefore, the DC components of the intra-frame data, are so arranged that they are recorded on every other track up to the tenth track in the same manner as above. The data corresponding to the areas a through e on the frame are so arranged that they are recorded in the specifically arranged areas to be played back by the tracing (shown by the solid line in FIG. 23) at the five-times speed playback mode, and the data corresponding to the areas a' through e' on the frame are so arranged that they are recorded in the specifically arranged areas to be played back by the tracking (shown by the broken lien in FIG. 23) at the reverse direction five-times speed playback mode.

From the eleventh track, the DC components corresponding to the areas f', g', h', i' and j' are so arranged that they are recorded on every other track in the specifically arranged areas at the forward direction five-times speed playback mode, and the data corresponding to the areas f, g, h, i and j are so arranged that they are recorded in the specifically arranged areas at the reverse direction five-times speed playback mode. This data arrangement takes around twenty tracks and data are so arranged that they are recorded on the twenty-first and subsequent tracks in the same manner as the recording on the first through twentieth tracks.

In this manner, the MPX 58, under the control of the data rearrangement controller 116, arranges the DC components of the intra-frame data as shown in FIG. 23, arranges the AC components of the intra-frame data from the intra-frame AC data memory 112 and the inter-frame data from the inter-frame data memory 52 to record them in other areas and outputs data to an error correction encoder 17. The error correction encoder 17 outputs this output with error correction parity added to a multiplexer 19. A sync/ID generator 20 generates a sync signal and an ID signal and outputs them to the multiplexer 19, which in turn outputs them by adding them to the output of the MPX 58. The output of the multiplexer 19 is recorded on a recording medium through the recording head (not shown).

Next, the decoding section will be explained in reference to FIG. 22.

The data played back from a recording medium by the playback head (not shown) are supplied to an error correction decoder 31 and a sync/ID detector 120. The error correction decoder 31, after correcting errors of the playback data, outputs the data to a demultiplexer (hereinafter referred to as DMPX) 62. A sync/ID detector 120 detects the sync signal and the ID signal contained in the playback data and outputs them to the DMPX 62. Determining the playback data arrangement from the output of the sync/ID detector 120, the DMPX 62 separates the playback data into DC components of the inter-frame data and the intra-frame data and AC components of the intra-frame data and outputs them to variable length decoders 65, 121 and 122. The variable length decoders 65, 121 and 122 decode the DC components of the inter-frame and the intra-frame data and the AC components of the intra-frame data and outputs them to an address generation multiplexer 125 and at the same time, outputs the decoded outputs to an inter-frame buffer 67, an intra-frame DC buffer 123 and an intra-frame AC buffer 124.

The address generation multiplexer 125 generates an indicating signal to restore the time sequence of the decoded data from the decoded data of the DC and the AC components of the intra-frame data and the decoded data of the inter-frame data and outputs it to a data rearrangement controller 126, a memory controller 70, a memory I-DC controller 128 and a memory I-AC controller 129. The memory controller 70, the memory I-DC controller 128 and the memory I-AC controller 129 control the read/write of the inter-frame buffer 67, the intra-frame DC buffer 123 and the intra-frame AC buffer 124 based on the indicating signal and the output of the data rearrangement controller 126, respectively. The outputs of the inter-frame buffer 67, the intra-frame DC buffer 123 and the intra-frame AC buffer 124 are applied to a MPX 71 which in turn restores the input data to the original data stream before the rearrangement of the recording section data based on the output from the data rearrangement controller 126 and outputs the data stream to a reverse quantizer 34, a header signal extractor 37 and a motion vector extractor 40.

Figure 9:
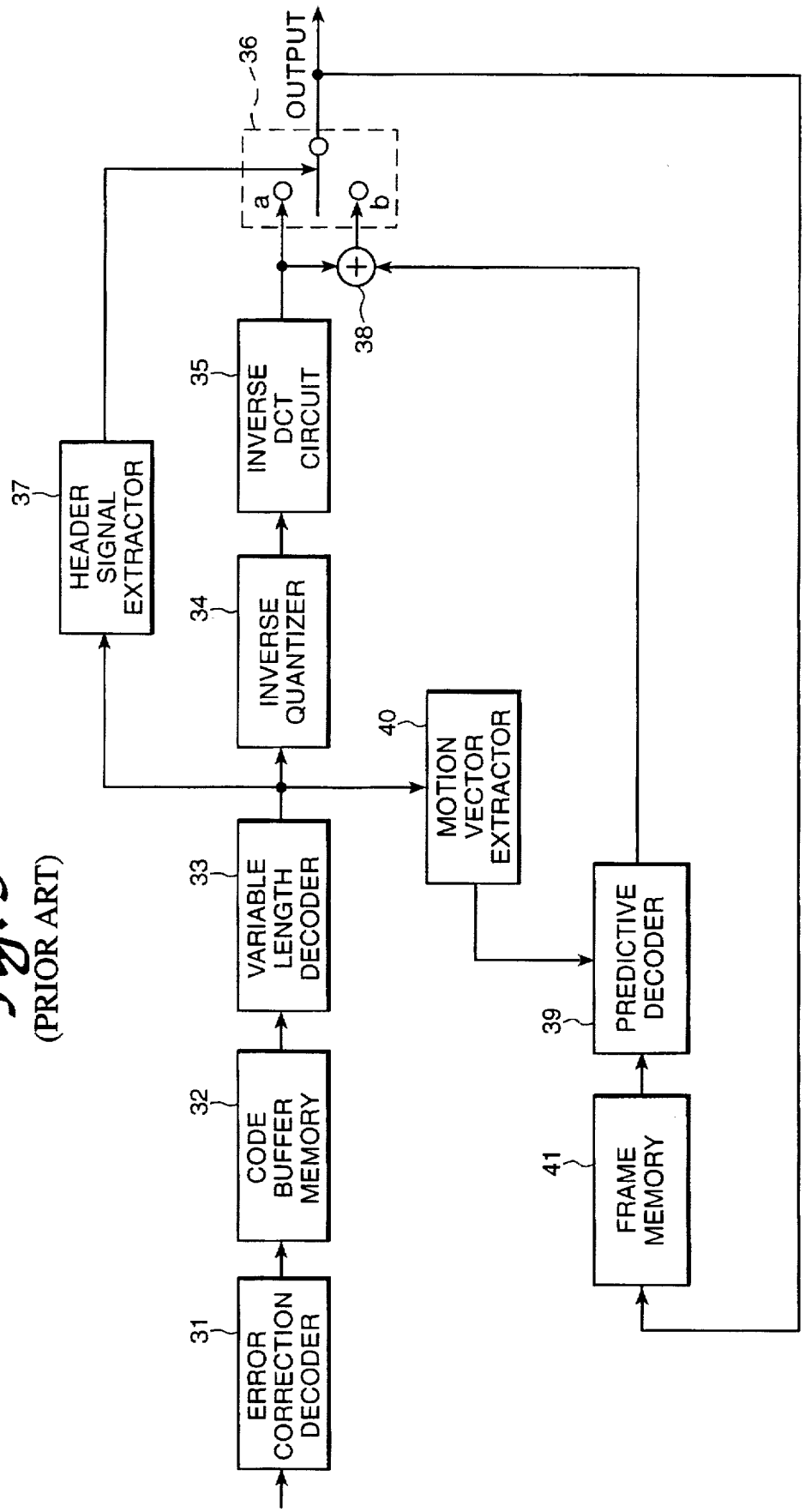
FIG. 9 is a block diagram showing the decoding section (the playback section) of a conventional variable length code recording/playback apparatus.
Figure 10A:
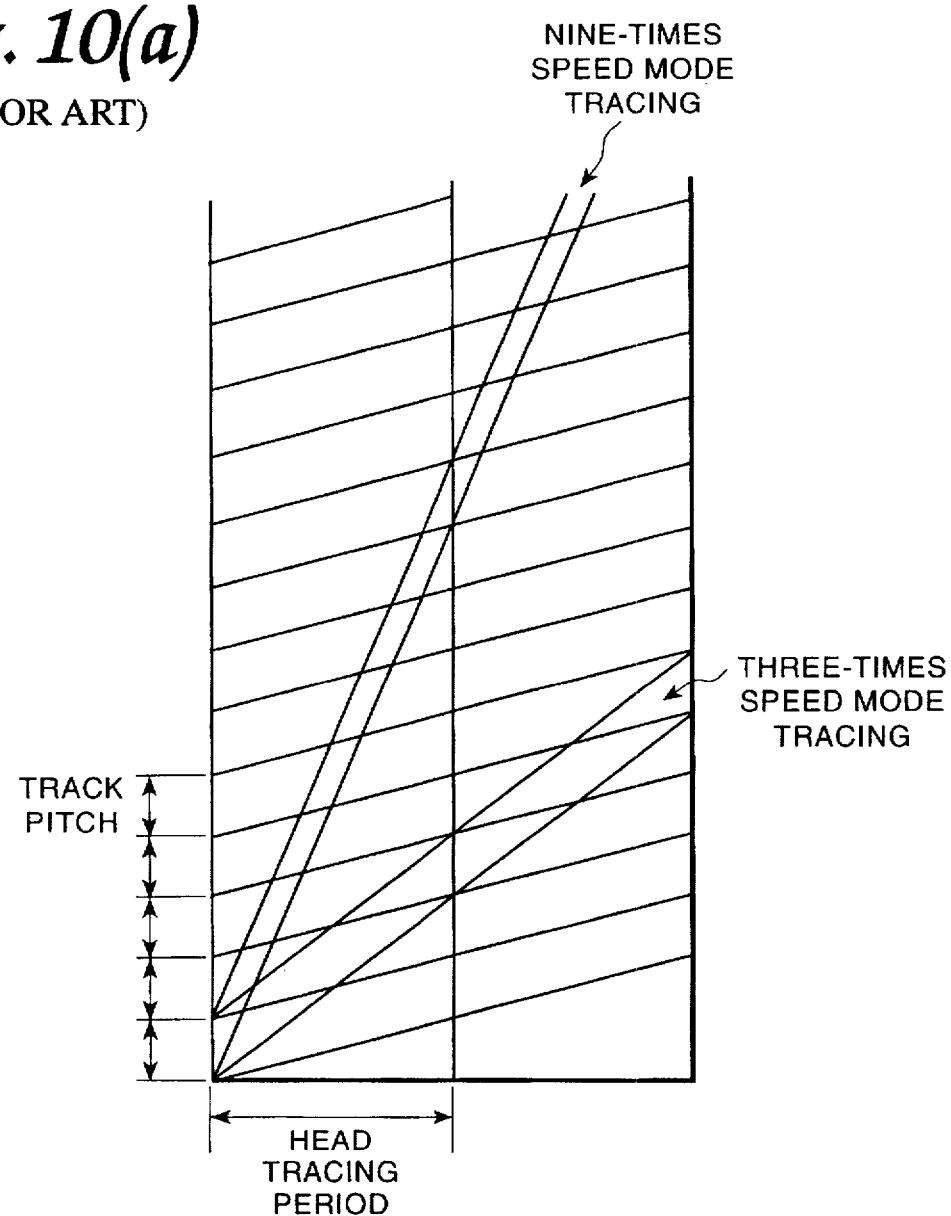
FIGS. 10(a) through 10(c) are explanatory diagrams for explaining the prior art in which important data are concentrated in the playback areas in the specialized playback mode.
Figure 10B:
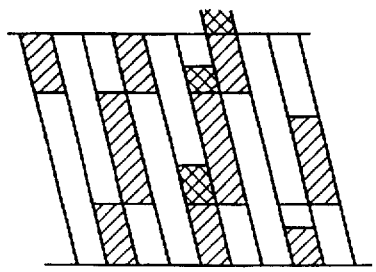
Figure 10C:
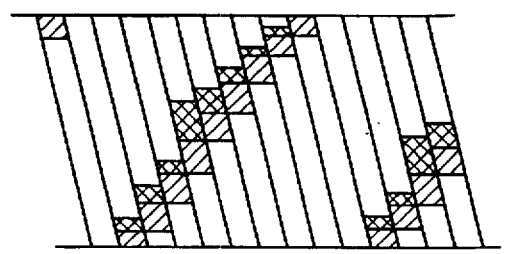

The following components are all of the same construction as those of the prior art as shown in FIG. 9: the reverse quantizer 34, which executes a reverse quantization on the input signal; a reverse DCT circuit 35, which executes a reverse DCT operation on the output of the reverse quantizer 34; the header signal extractor 37, which extracts a header signal; a motion vector extractor 49, which extracts a motion vector; a frame memory 41, which delays the output signal for one frame period; a predictive decoder 39, which compensates the output of the frame memory 41 for motion by the motion vector; an adder 38, which decodes the inter-frame data by adding the output of the reverse DCT circuit 35 and the output of the predictive decoder 39; and a switch 36, which outputs the decoded data of the intra-frame data and the decoded data of the inter-frame data by switching them.

Next, the operations of the recording/playback apparatus in such a construction as described above in this embodiment are explained in reference to the explanatory diagrams FIGS. 24(a) through 24(c), 25(a) through 25(c), and 26(a) through 26(c). FIGS. 24 (a) through 24(c) show the construction of the frame played back at the double-speed playback mode. FIGS. 25(a) through 25(c) show the construction of the frame played back at the five-times speed playback mode. FIGS. 26(a) through 26(c) show the construction of the frame played back at the reverse direction five-times speed playback mode.

In the recording section, the luminance signal Y and color difference signals Cr and Cb are multiplexed in units of 8 pixels×8 horizontal tracing lines per block. Furthermore, they are multiplexed in units of four macro blocks composed of two luminance signal blocks Y and each one of color signal blocks Cr and Cb and are applied to the subtracter 12. When generating the intra-frame data, the switch 14 is turned OFF, the output of the multiplexer 11 is processed by the DCT operation of the DCT circuit 13, and further, quantized in the quantizer 15 so that the bit rate is lowered. The quantized output is applied to the variable length encoder 16 and after encoded to a variable length code, it is output to the intra-frame DC data memory 112 and the intra-frame AC data memory 113.

Additionally, the output of the quantizer 15 is fed back to the subtracter 12 after it is delayed for one frame period, fed through the reverse quantizer 21, the reverse DCT circuit 2, the adder 23, the variable delay circuit 24, the motion compensator 25 and the switch 14. When generating the inter-frame data, the subtracter 12 subtracts the preceding frame data from the output of the multiplexer 12 and outputs a difference to the DCT circuit 13. The data rate of this difference data is lowered by the DCT circuit 13 and the quantizer 15. Then the data are converted to variable length codes and applied to the inter-frame data memory 52.

In this embodiment the address generation multiplexer 111 controls the data rearrangement controller 116, the memory controller 54, the memory I-DC controller 114 and the memory I-AC controller 115 by generating DC and AC components of the intra-frame data and the inter-frame data address from the output of the variable length encoder 16 and a refresh periodic signal showing the intra-frame. The memory controller 54, the memory I-DC controller 114 and the memory I-AC controller 115 are also controlled by the data rearrangement controller 116. As a result, the data read/write of the inter-frame data memory AC data memory 113 are controlled by the memory controller 54, the memory I-DC controller 114 and the memory I-AC controller 115, respectively, and the stored data are output to the MPX 58. The data rearrangement controller 116 also controls the MPX 58 and rearranges the data stream and outputs it so that DC components of the intra-frame data are recorded at the specific areas shown by the hatched section in FIG. 23.

The output of the MPX 58 is combined with an error correction parity by the error correction encoder 17 and is output after a sync signal and ID are further added in the multiplexer 19. The output of the multiplexer 19 is recorded on a recording medium through the recording head (not shown).

On the other hand, in the decoding section the playback output from a recording medium (not shown) is applied to the DMPX 62 after error correction in the error correction decoder 31. Now, it is assumed that the double-times speed playback has been performed. In this case, one of the adjacent tracks is able to be played back by adjusting the tracking. When the tracks 1, 3, 5 . . . in FIG. 23 are played back, the data corresponding to the areas a and a' are played back in the first tracing and the data corresponding to the areas b and b' are played back in the second tracing. Thereafter, the data corresponding to the areas a' through e' are played back in the tracings up to the tenth tracing, and the frame, as shown in FIG. 24(a), is obtained. In the next ten tracings, the data corresponding to the areas f through j as well as the areas f' through j' are played back, and the frame, as shown in FIG. 24(b), is obtained. FIG. 24(c) illustrates the frame to be played back in the next ten tracings.

Under the control by the output of the sync/ID detector 120, the DMPX 62 separates the DC and the AC components of the intra-frame data and the inter-frame data and outputs them to the variable length decoders 65, 121 and 122, respectively. The variable length decoders 65, 121 and 122 decode the input data to prescribed length data and outputs it to the inter-frame buffer 6, the intra-frame DC buffer 123 and the intra-frame AC buffer 124, respectively.

The decoded data from the variable length decoders 65, 121 and 122 are also applied to the address generation multiplexer 125. This address generation multiplexer 125 generates an indicating signal to restore the data sequence and outputs it to the memory controller 70, the memory I-DC controller 128, the memory I-AC controller 129 and the data rearrangement controller 126. The data rearrangement controller 126 controls the memory controller 70, the memory I-DC controller 128, the memory I-AC controller 129 and the MPX 71 based on the indicating signal. The memory controller 70, the memory I-DC controller 128 and the memory I-AC controller 129 control the read/write of the inter-frame buffer 67, the intra-frame DC buffer 123 and the intra-frame AC buffer 124 and outputs DC and AC components of the intra-frame data and the inter-frame data converted to prescribed length codes to the MPX 71. Under the control of the data rearrangement controller 126, the MPX 71 restores the received data to the original data arrangement and outputs these data.

The subsequent operations are the same as before, and the decoded data of the intraframe data are applied to the terminal a of the switch 36 by the reverse quantizer 34 and the reverse DCT circuit 35, and the decoded data of the inter frame data is applied to the terminal b of the switch 36 from the adder 38 which adds the decoded data of the preceding frame to the output of the reverse DCT circuit 35. The switch 36, under the control of the header signal extractor 37, switches the terminals a and b, and outputs decoded output. Thus, the double-speed playback mode becomes possible.

Next, it is assumed that the five-times speed playback will be performed. In this case, the tracing by the magnetic head (not shown) is made as shown by the solid line in FIG. 23, and data corresponding to the areas a, b and c are played back in the first tracing. In the second tracing, data corresponding to the areas d and e are played back. At the point of time, only data corresponding to the areas a through e in the upper half of the frame are played back. In the next third tracing, data corresponding to the areas f', g' and h' are played back and in the fourth tracing, data corresponding to the areas i' and j' are played back. Then data corresponding to the areas f' through j' in the lower half of the frame are also played back. Therefore, at the five-times speed playback mode, one playback frame can be composed by the first through fourth tracings. Further, FIG. 25(c) illustrates the frame which is played back in the fifth and sixth tracings.

Again, it is assumed that the reverse direction five-times speed playback will be performed. The head tracing in this case is as shown by the broken line in FIG. 23. In the first tracing, for instance, data corresponding to the areas j and i are played back. In the second tracing, corresponding to the areas h, g and f are played back. At this point in time, data corresponding to the areas f through j in the upper half of the frame are played back as shown by the hatched section in FIG. 26(a). In the third tracing, data corresponding to the areas e' and d' are played back. In the fourth tracing, data corresponding to the areas c', b' and a', are played back. Thus, data corresponding to the areas a' through e' in the lower half of the frame are played back as shown in FIG. 26(b), and one playback frame is composed in the first through the fourth tracings. Further, FIG. 26(c) illustrates the playback areas in the fifth and the sixth tracings.

Thus, in this embodiment, when recording data, they are rearranged so that corresponding data are recorded in the same locations of the frames in the playback areas in the high speed playback in both the forward and the reverse directions. Thus good quality playback pictures can be obtained in the high speed playback mode in both the forward and the reverse directions by playing back several frames. Further, the double-speed playback mode is possible by playing back a specifically arranged area for every track.

Figure 27:
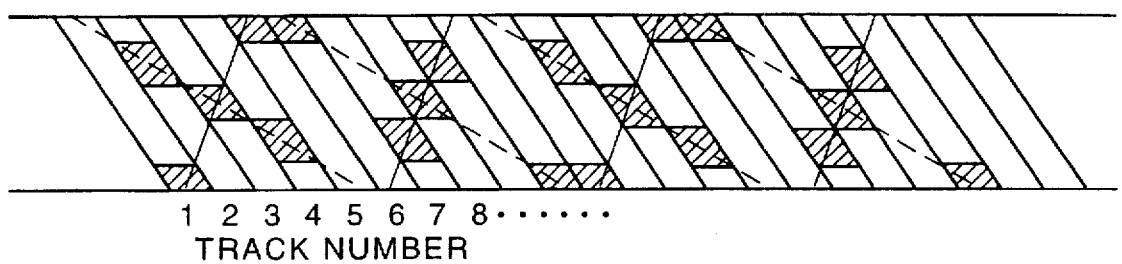
FIG. 27 is an explanatory diagram for explaining a modification of the first embodiment of the present invention.

FIG. 27 is an explanatory diagram for explaining a modification of the first embodiment of the present invention.

In this modification, the arrangement of the DC components of the intra-frame data on the recording tracks differs from the those at the first embodiment shown in FIGS. 21 and 22, but the circuit configurations in both the first embodiment and its modification are the same. The DC components of the intra-frame data are so arranged that on the odd number tracks they are recorded in the areas played back at the forward direction five-times speed playback mode, while on the even number tracks they are recorded in the areas played back at the reverse direction five-times speed playback mode.

In the modification constructed as above, the number of areas played back at the forward direction and the reverse direction five-times speed playback modes are the same as those in the first embodiment, as shown in FIGS. 21 and 22. Therefore, for instance, data corresponding to the areas in the upper half of the frame can be played back in the first and the second tracings and data corresponding to the areas in the lower half of the frame can be played back in the third and fourth tracings. Thus, the same effect as in the first embodiment shown in FIGS. 21 and 22 is obtained. Further, the head for tracing specifically arranged areas differs in the forward direction high speed playback mode and the reverse direction high speed playback mode and as the head to be used is specified according to the playback mode, the system construction will become easier.

Figure 28:
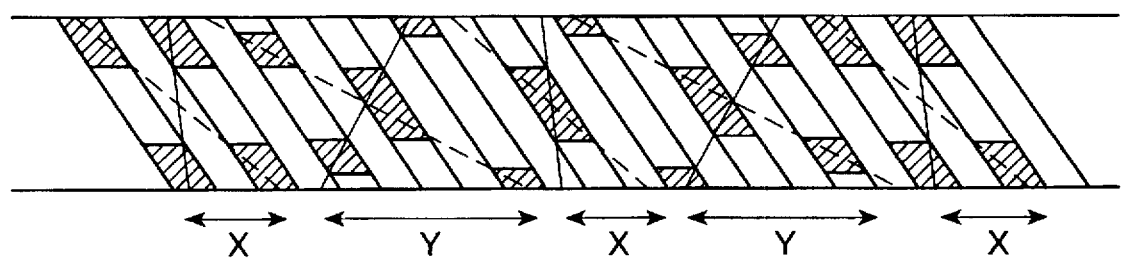
FIG. 28 is an explanatory diagram for explaining another modification of the first embodiment.

FIG. 28 is an explanatory diagram for explaining the modification of the first embodiment. As shown in FIG. 28, this modification has also made it possible to perform the forward direction and the reverse direction triple-speed playback modes as well as the forward direction and the reverse direction six-times speed playback modes.

In this modification, only the arrangement of the DC components of the intra-frame data on the recording tracks differs from the first embodiment shown in FIGS. 21 and 22. That is, data are so arranged that the DC components are recorded in specifically arranged areas adapted for the forward direction and the reverse direction triple-speed playback modes on every other track for the first through the third tracks, the tenth through the twelfth tracks, and so on (hereinafter referred to as X track), while in other specifically arranged areas adapted for the forward direction and the reverse direction six-times speed playback modes on every other track for the fourth through ninth tracks, the thirteenth through the eighteenth tracks, and so on (hereinafter referred to Y track).

In this modification performing the operation shown in FIG. 28, in the forward direction and the reverse direction triple-speed playback modes at least DC components recorded in the specifically arranged areas of the X tracks are able to be played back and one sheet of playback pictures can be obtained by playing back several frames. Further, in the forward direction and the reverse direction six-times speed playback modes, the DC components recorded in at least the specifically arranged areas of Y tracks are able to be played back and the playback image can be obtained by playing back several frames. In this modification, a plurality of the specific speed playback modes are made possible by increasing the number of continuous Y tracks to an integer times of the number of continuous X tracks without increasing data volume.

Figure 29:
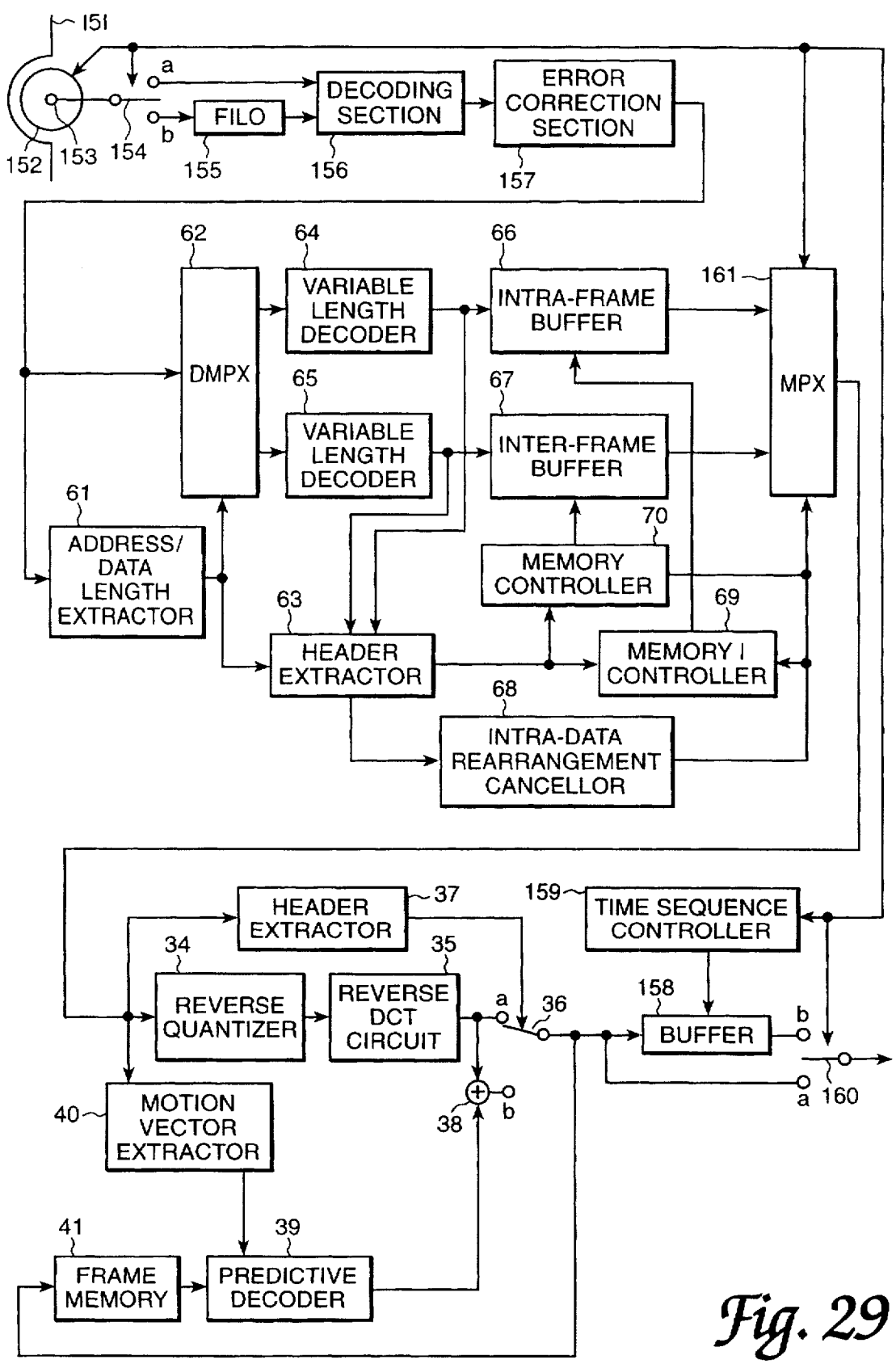
FIG. 29 is a block diagram showing a playback apparatus according to a second embodiment of the present invention.

Referring now to FIGS. 29 through 32, a second embodiment of the present invention embodying a playback apparatus will be described. FIG. 29 is a block diagram showing a playback apparatus according to the second embodiment of the present invention.

In this second embodiment, the rotary cylinder 153 is adapted to rotate in any direction. Thus, the rotary cylinder 153 can rotate in the same direction as the running of the tape. In the recording mode, signals are recorded on the tape running in the forward direction, while the rotary cylinder 153 rotates in a prescribed direction as in the conventional apparatus. In the forward playback operation in any speed as described in the first embodiment, the rotary cylinder 153 also rotates in the prescribed direction. On the other hand, in the reverse playback operation in any speed, the rotary cylinder 153 rotates in an opposite direction so that magnetic heads trace the recorded track but in the opposite direction for each track. When the reverse playback operation is performed, the playback signals are output through the FILO (first-in last-out) circuit 155 so that the correct sequence of the playback signal is recovered.

Figure 30A:
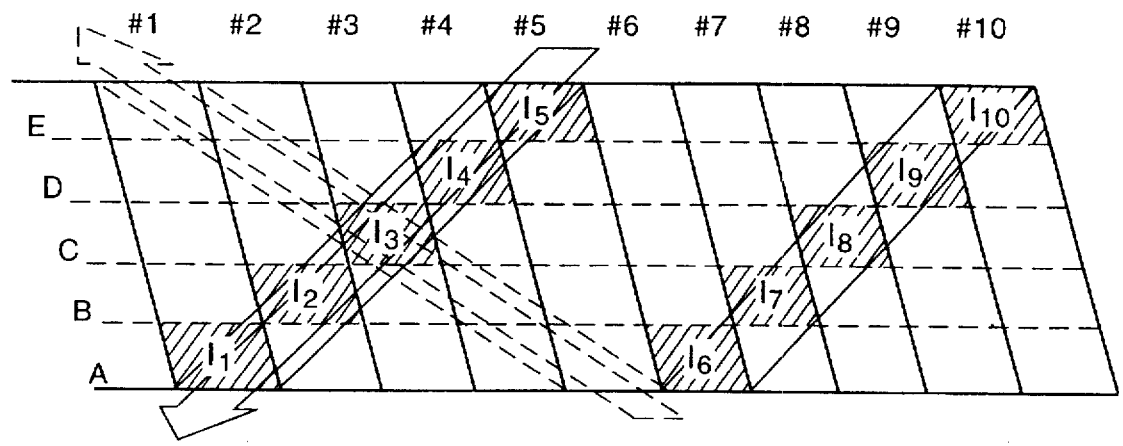
FIGS. 30(a) through 30(b) are explanatory diagrams for explaining the operation of the apparatus according to the second embodiment.
Figure 30B:
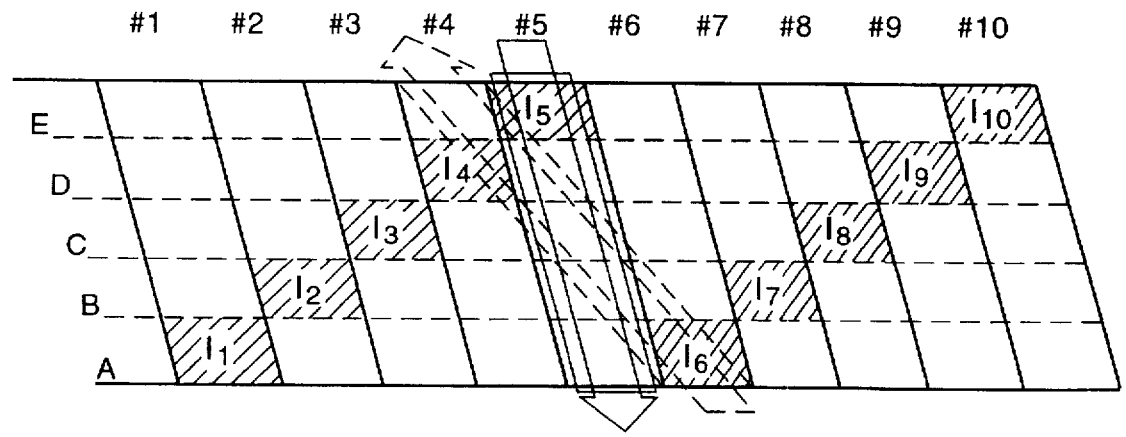

FIG. 30(a) shows the head trace pattern in the reverse direction five-times speed playback mode, while FIG. 30(b) shows the head trace pattern in the reverse direction normal speed playback mode.

Figure 31A:
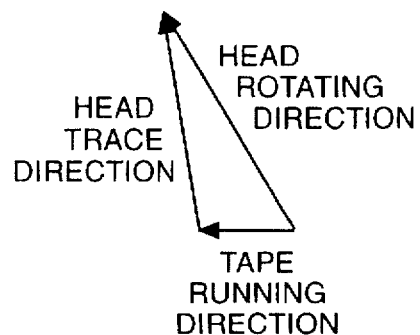
FIGS. 31(a) through 31(f) are explanatory diagrams for explaining the operation of the apparatus according to the second embodiment.
Figure 31B:
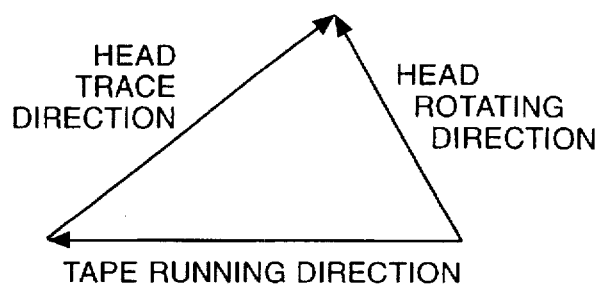
Figure 31C:
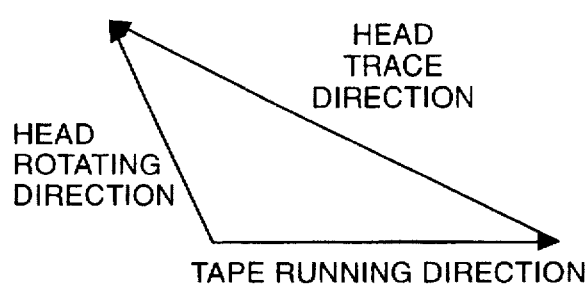
Figure 31D:
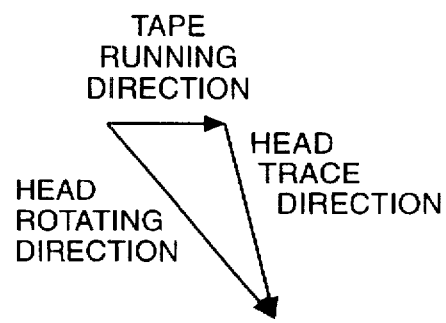
Figure 31E:
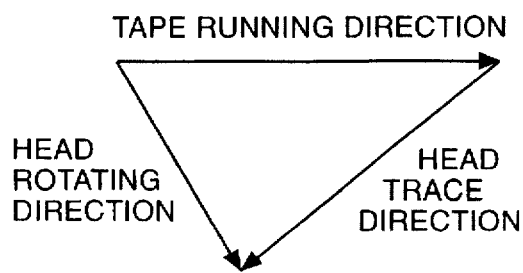
Figure 31F:
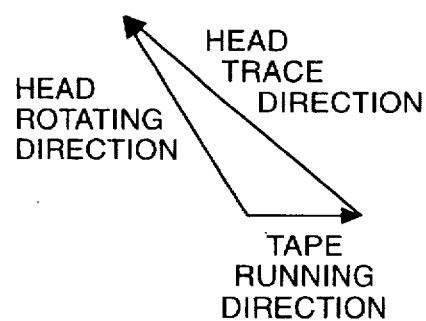

FIGS. 31(a) through 31(f) diagrammatically show several examples of relations among the tape running direction, the rotating direction of the rotary cylinder and the head trace direction, i.e., FIG. 31(a) for the normal playback mode, FIG. 31(b) for the forward direction high-speed playback mode, FIG. 31(c) for the conventional reverse direction high-speed playback mode, FIG. 31(d) for the reverse direction normal speed playback mode as shown in FIG. 30(b), FIG. 31(e) for the reverse direction five-times speed playback mode as shown in FIG. 30(a), and FIG. 30(f) for the conventional reverse direction normal speed playback mode.

FIG. 32 shows a modification of the second embodiment, i.e., an error correction block to be applied for the playback apparatus in place of the error corrector 157 as shown in FIG. 29.

Figure 33:
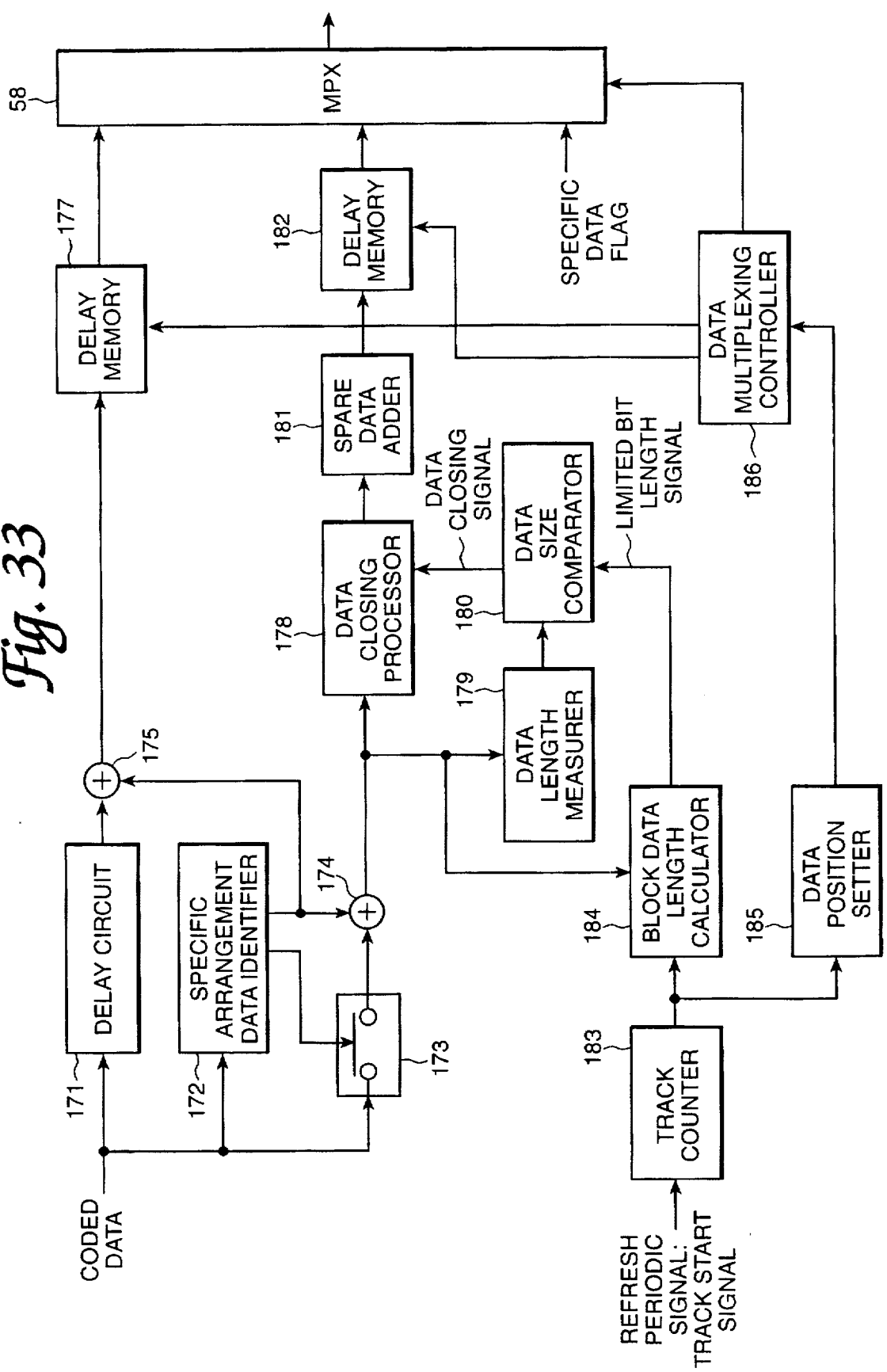
FIG. 33 is a block diagram showing a recording section of the recording/playback apparatus according to a third embodiment of the present invention.

Referring now to FIGS. 33 through 41(b), a third embodiment of the present invention embodying a recording/ playback apparatus will be described. FIG. 33 shows a recording section of the recording/playback apparatus according to the third embodiment. In FIG. 33, this recording section includes circuit elements for limiting data in each data block for keeping a prescribed number of bits.

Figure 35A:
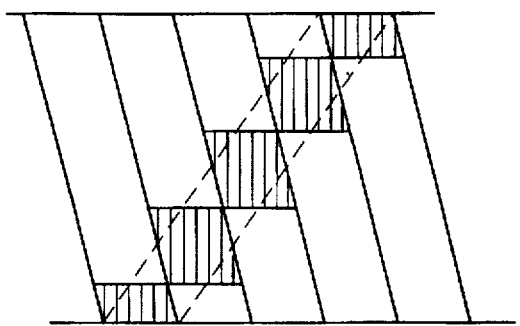
FIGS. 35(a) and 35(b) are explanatory diagrams for explaining the operation of the apparatus according to the third embodiment.
Figure 35B:
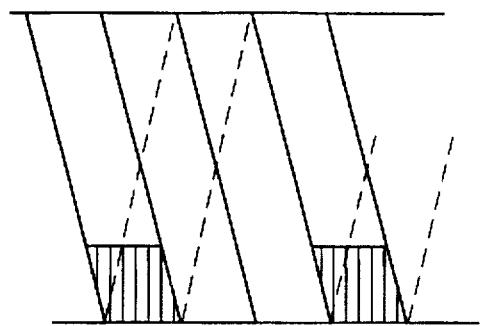

FIG. 35(a) illustrates a recording pattern adopted for the forward direction five-times speed playback mode, while FIG. 35(b) illustrates a recording pattern adopted for the forward direction three-times speed playback mode. In these drawings, the hatched areas represent areas that important data such as the DC components of the intra-frame data are recorded on, but reduced to a prescribed amount of data.

To reduce the important data to the prescribed amount, the recording section, as shown in FIG. 33 includes a data amount closing processor 178 and a controller for the processor 178 including a data length measuring circuit 179, a data size comparator and a block data calculator 184.

Figure 34:
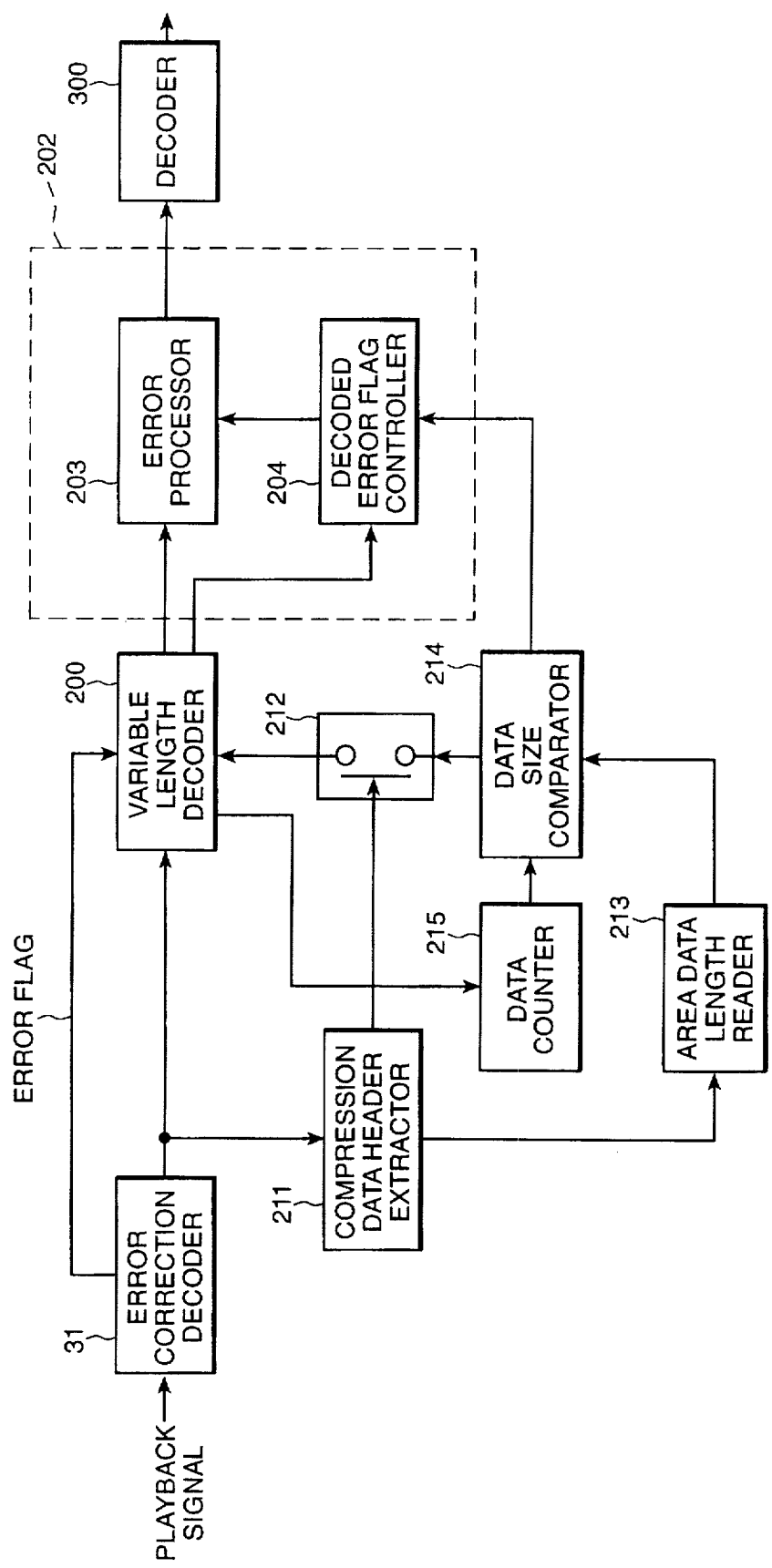
FIG. 34 is a block diagram showing a playback section of the recording/playback apparatus according to the third embodiment of the present invention.

In correspondence with the recording section of FIG. 33, a playback section as shown in FIG. 34, includes a variable length decoder 200, a compression data header extractor 211, etc., in an error correction block.

Figure 36:
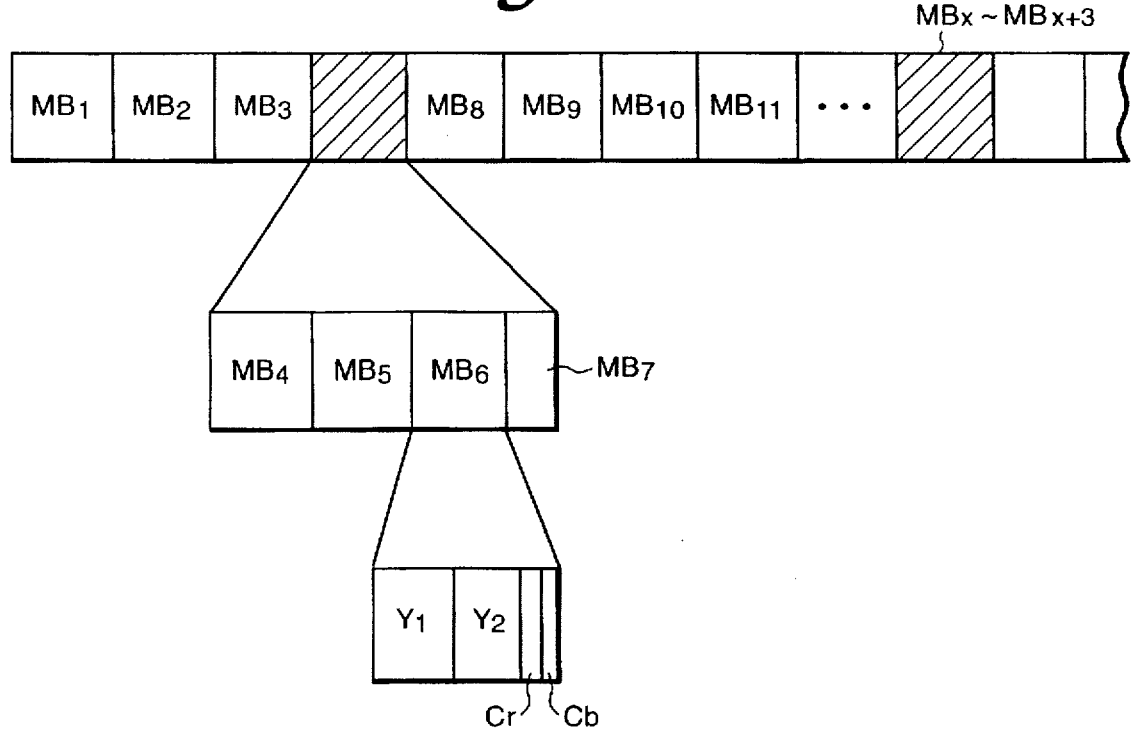
FIG. 36 is another explanatory diagram illustrating the specific data arrangement according to the third embodiment.
Figure 37A:
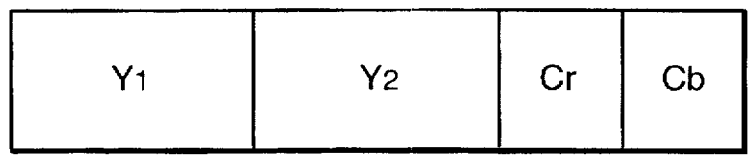
FIGS. 37(a) through 37(e) are explanatory diagrams for explaining the operation of the apparatus according to the third embodiment.
Figure 37B:
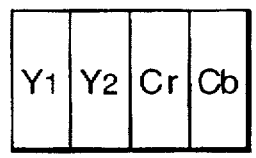
Figure 37C:
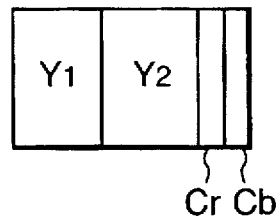
Figure 37D:
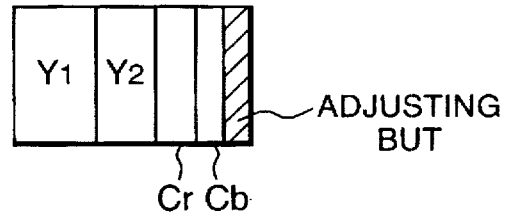
Figure 37E:
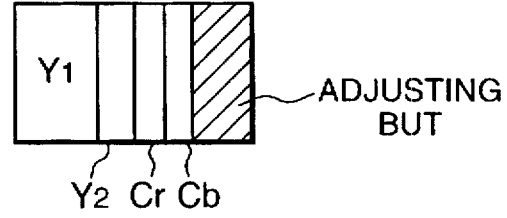

FIGS. 36 and 37(a) through 37 (e) illustrate the operation of the third embodiment as shown in FIGS. 33 and 34. FIG. 36 shows the specific arrangement of the data, while FIGS. 37(a) through 37(e) show limited length data.

Figure 38:
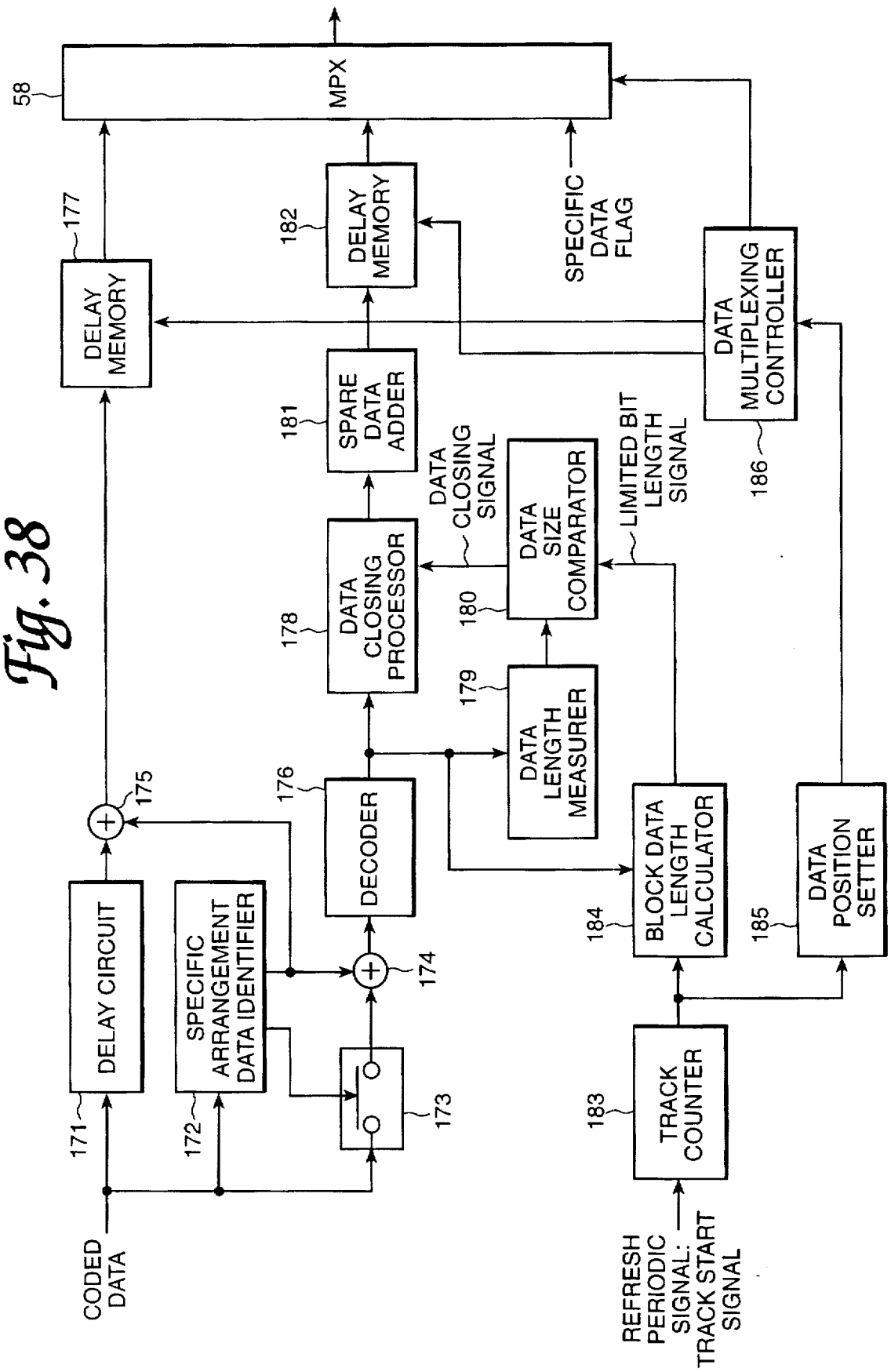
FIG. 38 is block diagram showing a modification of the recording section of the apparatus according to the third embodiment of the present invention.

FIG. 38 shows the recording section of the recording/ playback apparatus according to a modification of the third embodiment of the present invention. In this modification of the recording section, the data amount closing process is performed after the specifically arranged data have been decoded. Thus a decoder 176 is provided before the data amount closing processor 178. FIG. 39 illustrates the operation of the recording section, as shown in FIG. 38.

FIG. 40 shows a modification of the playback section of the apparatus according to the third embodiment. That is, the playback section further includes the circuit, as shown in FIG. 40, which will be added before the variable length decoder 200 in FIG. 34. FIGS. 41(a) and 41(b) illustrate the operation of the circuit, as shown in FIG. 40, added to the playback section as shown in FIG. 34.

Figure 42:
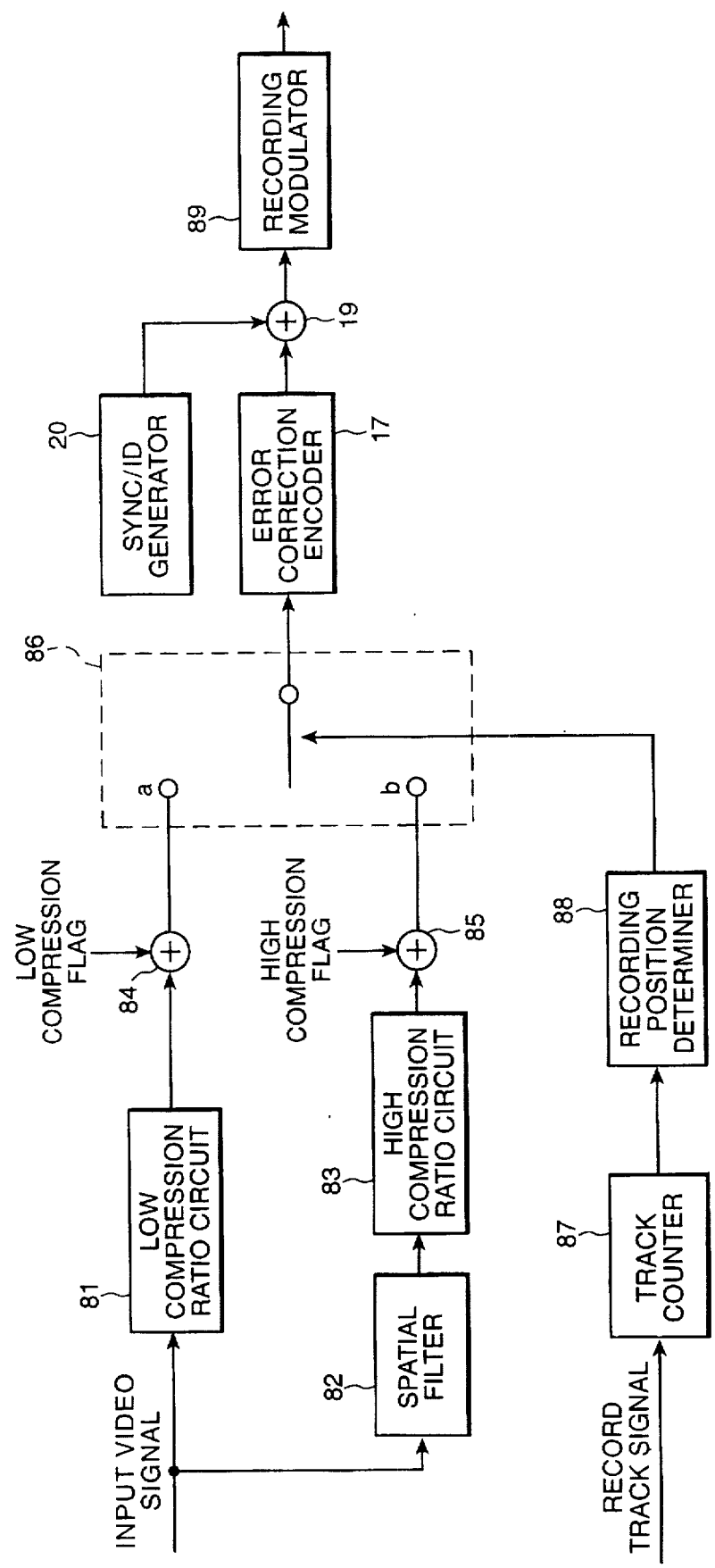
FIG. 42 is a block diagram showing a recording section of the high efficiency coding/decoding apparatus according to a fourth embodiment of the present invention.

Referring now to FIGS. 42 through 54, a fourth embodiment of the present invention embodying a high efficiency encoding/decoding apparatus will be described. FIG. 42 shows a recording section of the apparatus according to the fourth embodiment. In FIG. 42, this recording section includes data processing elements; i.e., a spatial filter 82 for limiting a data band, a high compression ratio processor 83 etc., for highly compressing a data in each data block shorter than a prescribed data length for keeping a prescribed number of bits, as well as a low compression ratio processor 81, and control elements; i.e., a track counter 87, a recording position determiner 88, adders 84 and 85 for introducing a low compression flag and a high compression flag, and a selector 86 for suitably selecting the high compression ratio processor 83 and the low compression ratio processor 81.

Figure 43A:
FIGS. 43(a) through 43(d) are explanatory diagrams for explaining the data compression ratio according to the fourth embodiment.
Figure 43B:
Figure 43C:

FIGS. 43(a) through 43 (d) illustrate data lengths in operation of the recording section according to the fourth embodiment as shown in FIG. 42. FIG. 43(a) represents the data length of the input video signal. FIG. 43(b) represents the data length obtained by the high compression ratio processor 83. FIG. 43(c) represents the data length obtained by the low compression ratio processor 81. FIG. 43(d) represents a data length obtained by a multiple stage compression ratio processor as described later.

Figure 44A:
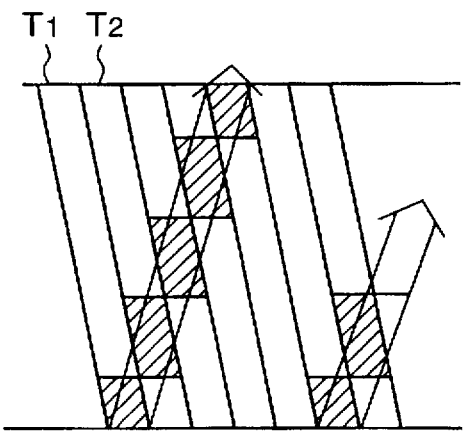
FIGS. 44(a) and 44(b) are explanatory diagrams for explaining the operation of the apparatus according to the fourth embodiment.
Figure 44B:
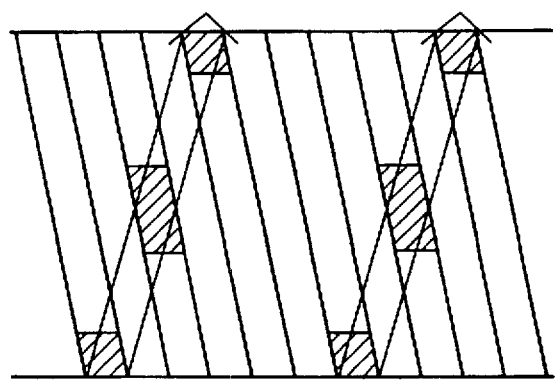

FIGS. 44(a) and 44(b) illustrate two examples of recording positions for the highly compressed data from the high compression ratio processor 83 under the control of the recording position determiner 88, at the tracing in the five-times speed playback mode. In FIG. 44(a) the data are recorded on all tracks, while in FIG. 44(b) the data are recorded on every other track.

Figure 45:
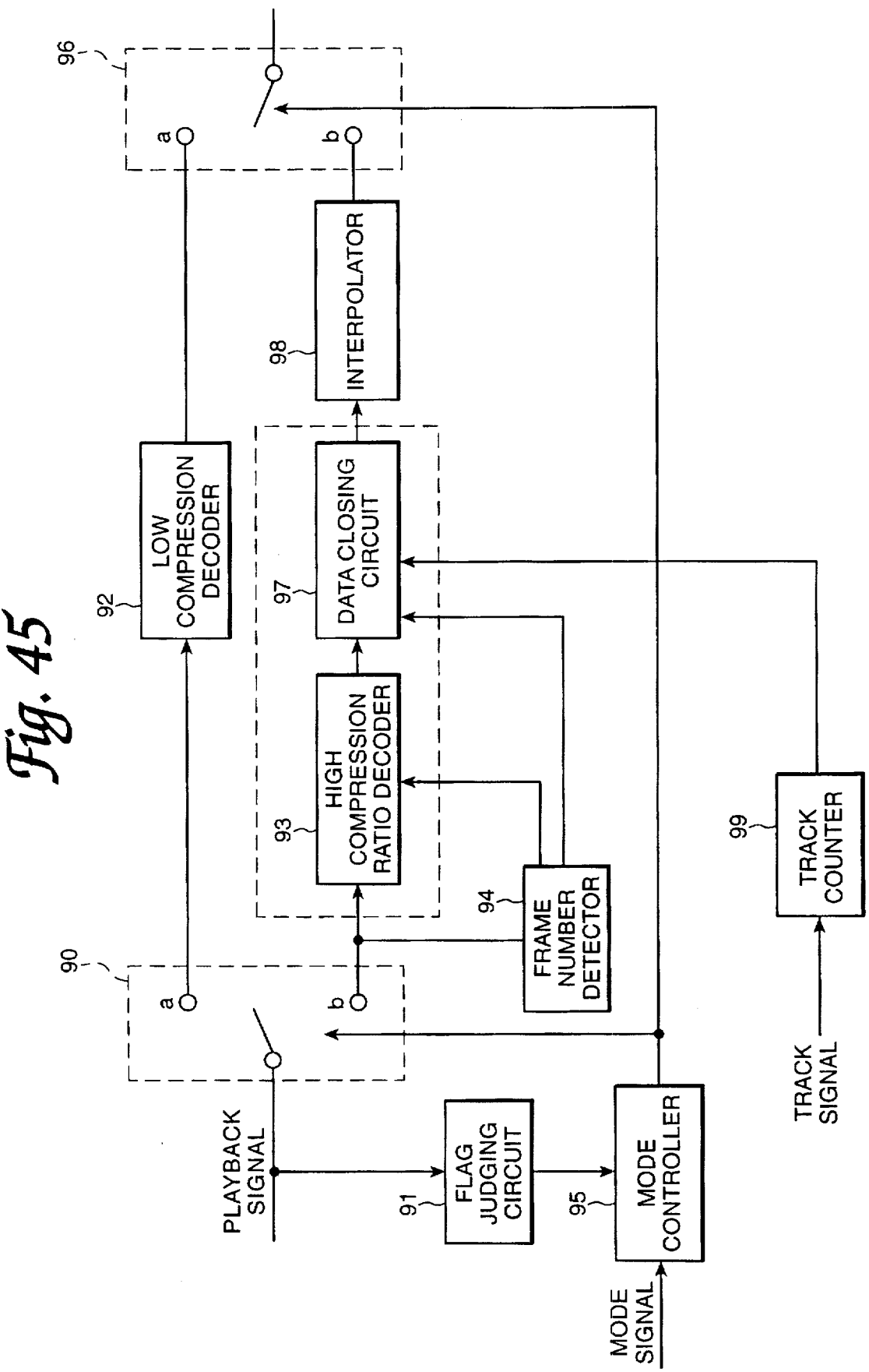
FIG. 45 is a block diagram showing a playback section of the high efficiency coding/decoding apparatus according to the fourth embodiment of the present invention.

In correspondence with the recording section of FIG. 42, a playback section as shown in FIG. 45, includes a high compression data decoder 93, a patcher 97 and an interpolator 98 as well as a low compression data decoder 92. The operations of the high compression data decoder 93 etc., and the low compression data decoder 92 are selected by selectors 90 and 96 under the control of a flag determiner 91, a mode controller 95, a frame number detector 94 and a track counter 99.

Figure 46A:
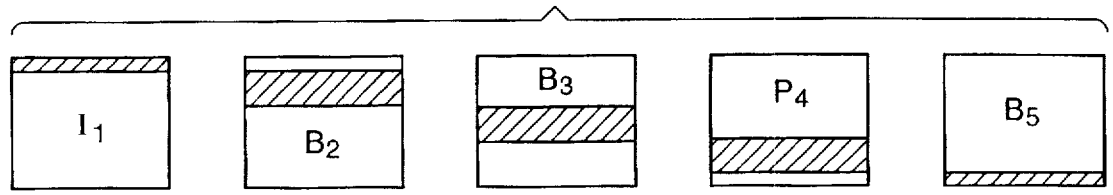
FIGS. 46(a) through 46(c) are explanatory diagrams for explaining the operation of the apparatus according to the fourth embodiment.
Figure 46B:
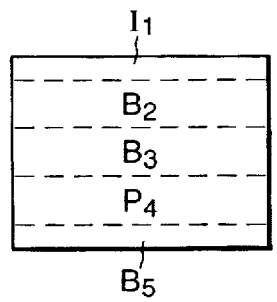
Figure 46C:
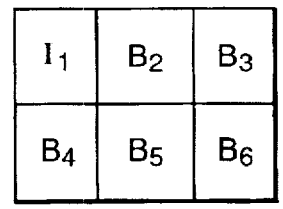

For example, in the five-times speed playback mode operation of the playback section as shown in FIG. 45, the highly compressed data, i.e., an intra-frame data I1 and four inter-frame data B2 through B5 are sequentially played back from the first through fifth tracks, as shown in FIG. 46(a). These playback data I1 and B2 through B5 are patched together into frame image data as shown in FIG. 46(b) by the patcher 97. Alternatively, in case of a six-times speed playback mode playback data I1 and B2 through B6 can be arranged on six divided sub-screens, as shown in FIG. 46(c).

Figure 47:
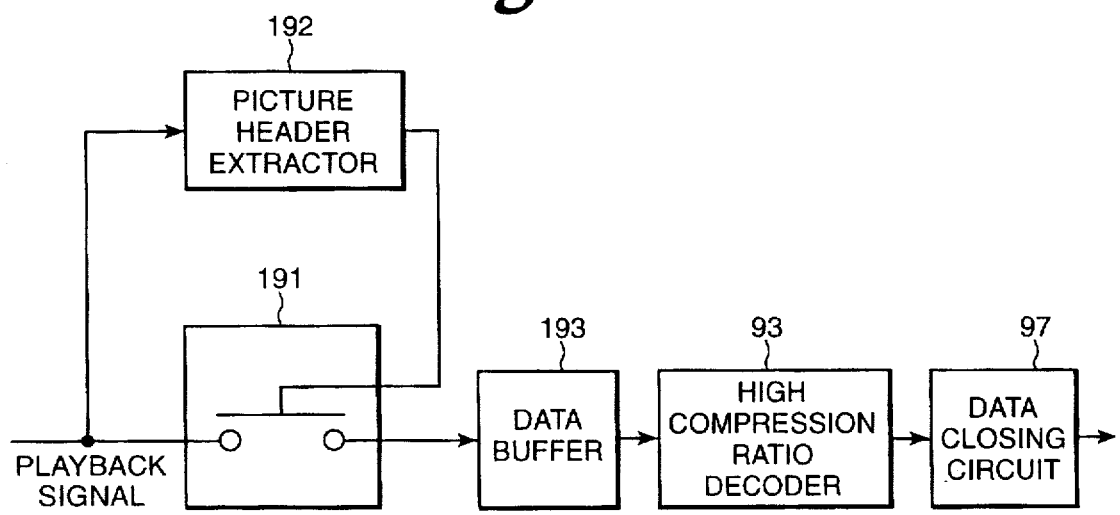
FIG. 47 is a block diagram showing a first modification of the apparatus according to the fourth embodiment.

FIG. 47 shows a first modification of the playback section of the apparatus according to the fourth embodiment. That is, the first modification of the playback section includes a selector 191, a picture header extractor 192 and a data buffer 193 in place of the selector 90. The picture header extractor 192 controls the selector 191 based upon whether the input playback signal is the intra-frame data I, the inter-frame data P or the inter-frame data B.

Figure 48:
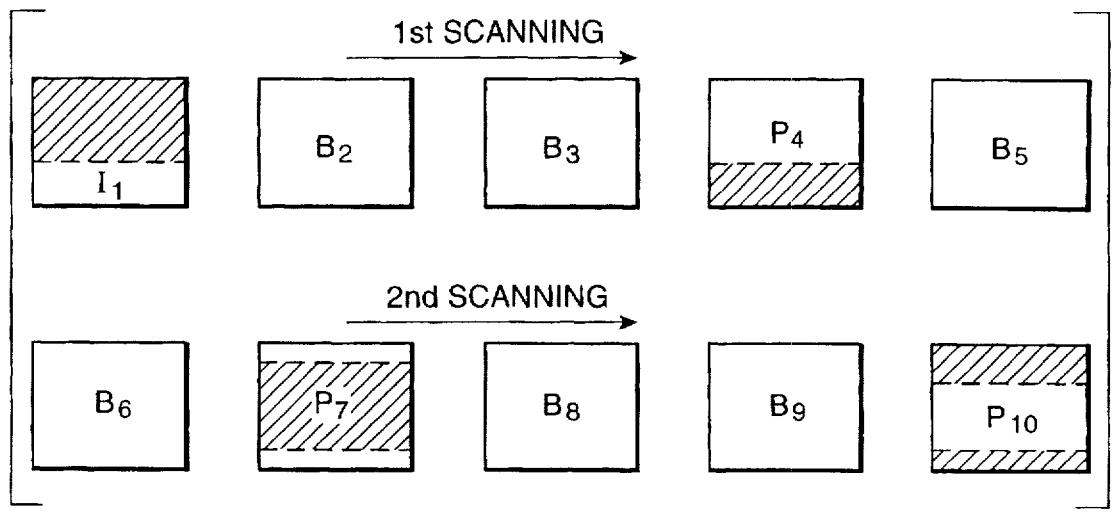
FIG. 48 is an explanatory diagram for explaining the operation of the first modification of the apparatus according to the fourth embodiment.
Figure 49:
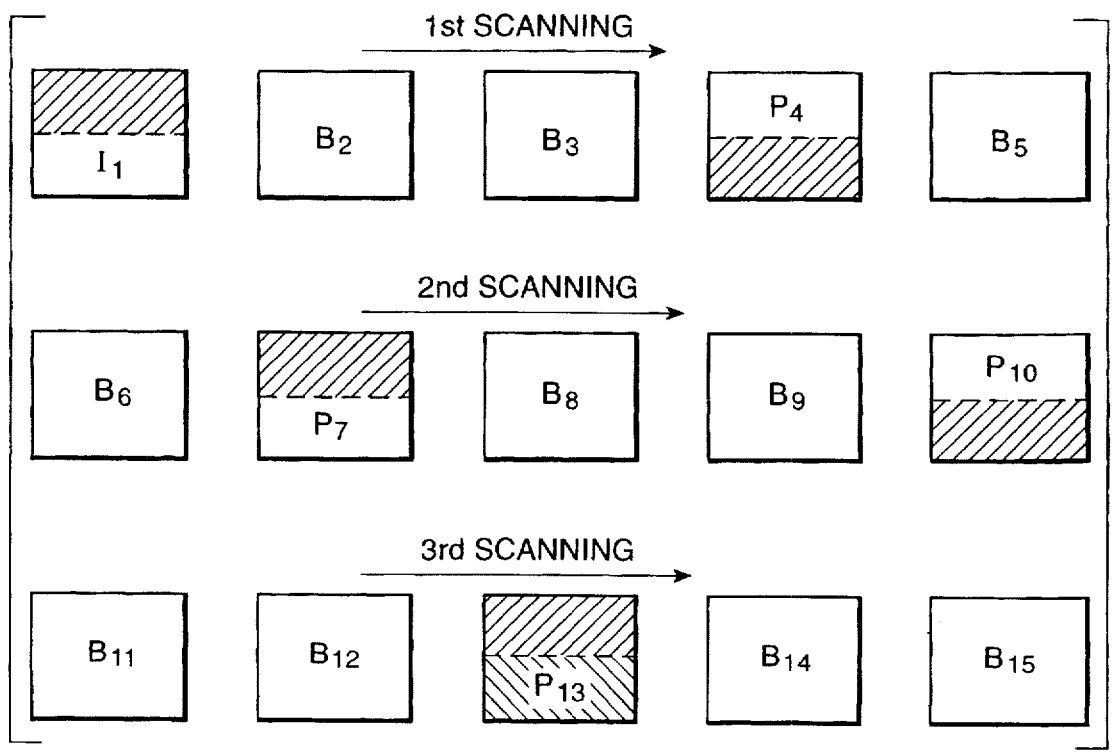
FIG. 49 is another explanatory diagram for explaining the operation of the first modification of the apparatus according to the fourth embodiment.

FIGS. 48 and 49 show the operation of the first modification of the playback section as shown in FIG. 47. In a first scanning playback data I1, B2, B3, P4 and B5 are sequentially obtained by the high compression data decoder 93 , while in a second scanning playback data B6, P7, B8, B9 and P10 are sequentially obtained also by the high compression data decoder 93. Then these data are patched together by the patcher 97 for forming a complete frame image. Alternatively, the complete frame image can be formed through three scannings as shown in FIG. 49.

Figure 50:
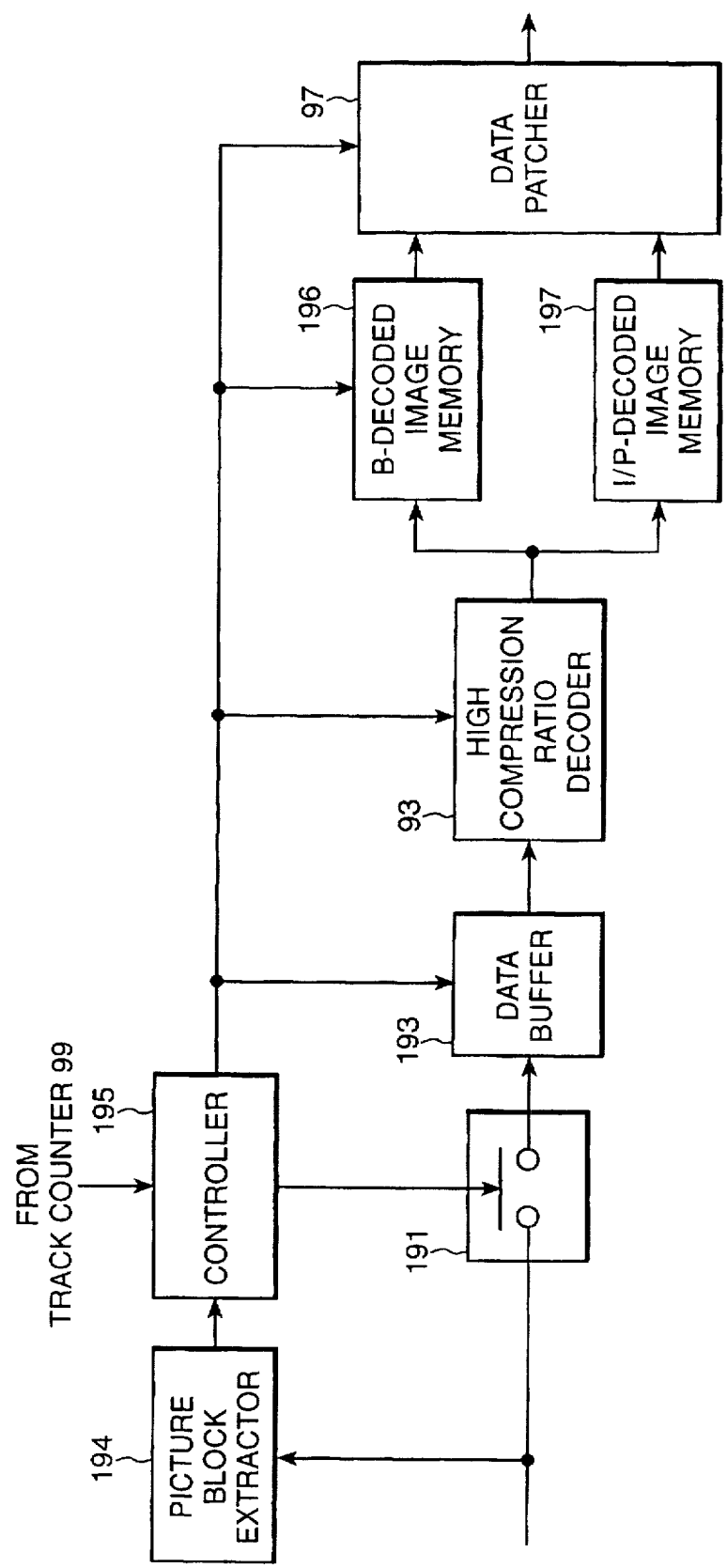
FIG. 50 is a block diagram showing a second modification of the apparatus according to the fourth embodiment.

FIG. 50 shows a second modification of the playback section of the apparatus according to the fourth embodiment. That is, the second modification of the playback section further includes a picture block extractor 194, a controller 195 controlled by the track counter 99 in FIG. 45, a B decode image memory 196 and an I/P decode image memory 197. The picture block extractor 194 determines whether the playback signal is an intra-frame data I, an inter-frame data P or an inter-frame data B. Then the controller 195 controls the selector 191 under the control of the discrimination output from the picture block extractor 194.

Figure 51:
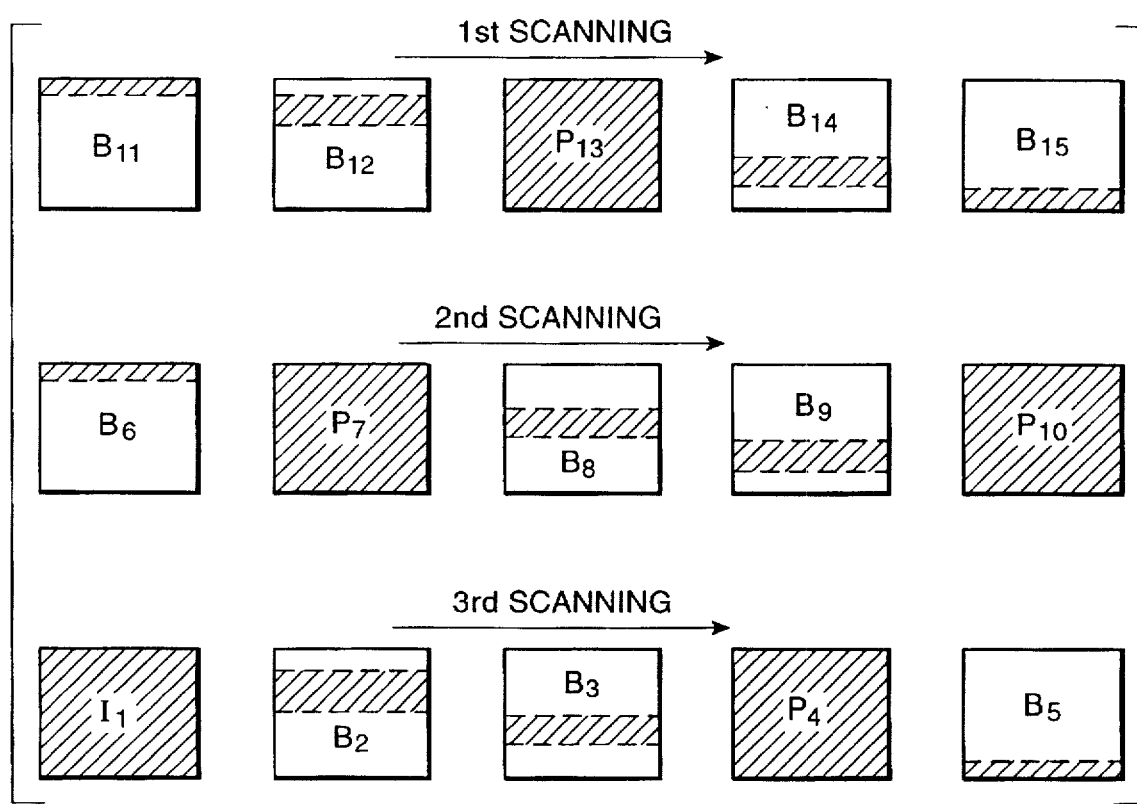
FIG. 51 is an explanatory diagram for explaining the operation of the second modification of the apparatus according to the fourth embodiment.

FIG. 51 shows the operation of the second modification of the playback section as shown in FIG. 50. In a first scanning playback data I1, B2, B3, P4 and B5 are sequentially obtained by the high compression data decoder 93. In a second scanning playback data B6, P7, B8, B9 and P10 are sequentially obtained also by the high compression data decoder 93. In a third scanning playback data B11, B12, P13, B14 and B15 are sequentially obtained also by the high compression data decoder 93. Then these data are patched together by the patcher 97 for forming a complete frame image.

Figure 52:
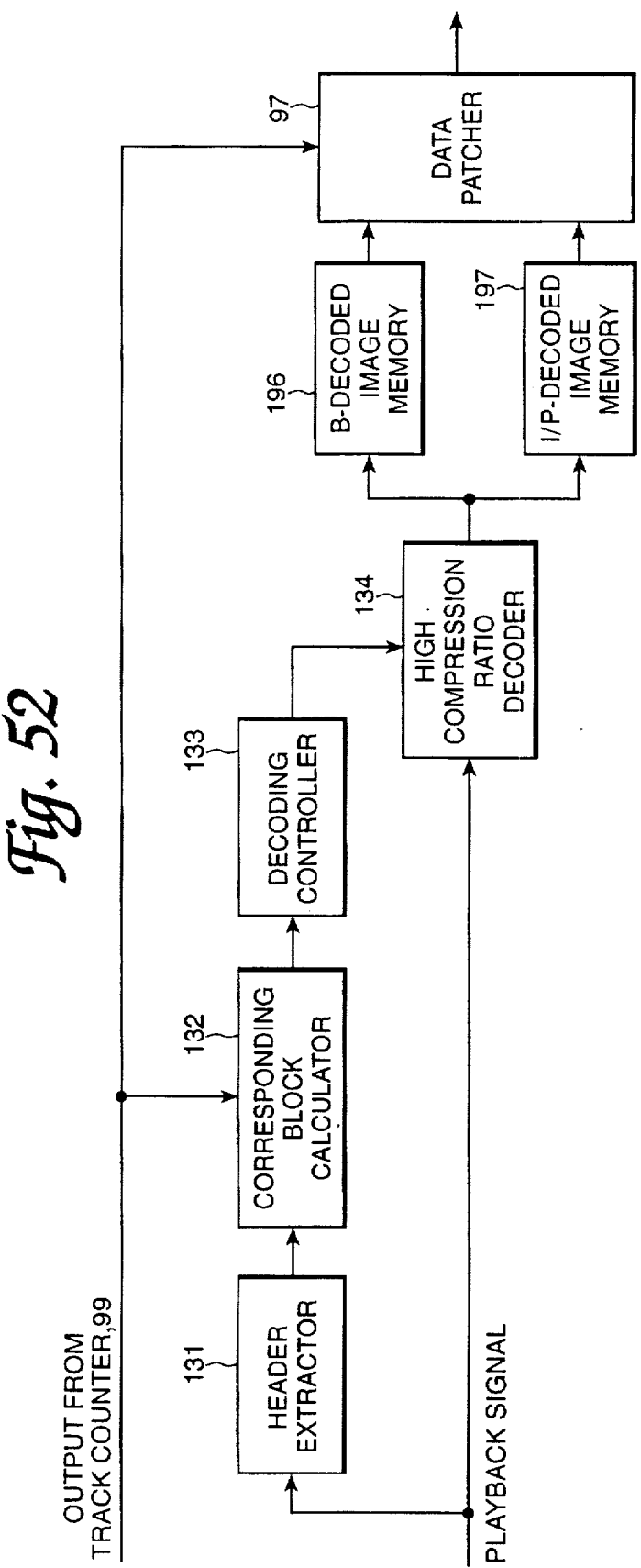
FIG. 52 is a block diagram showing a third modification of the apparatus according to the fourth embodiment.

FIG. 52 shows a third modification of the playback section of the apparatus according to the fourth embodiment. That is, the third modification of the playback section further includes a header extractor 131, a corresponding block calculator 132, a decoding controller 133 and a picture block extractor 194 and a controller 195 controlled by the track counter 99 in FIG. 45. The header extractor 131 determines whether the playback signal is an intra-frame data I, an inter-frame data P or an interframe data B. Then the corresponding block calculator 132 calculates a block data to be decoded from the playback signal under the control of the track counter 99. The decoding controller 133 controls the high compression data decoder 134 under the control of the output from the decoding controller 133. According to the third modification of the playback section, only the data defined by the hatched sections in FIG. 51 can be decoded.

Figure 43D:
Figure 53:
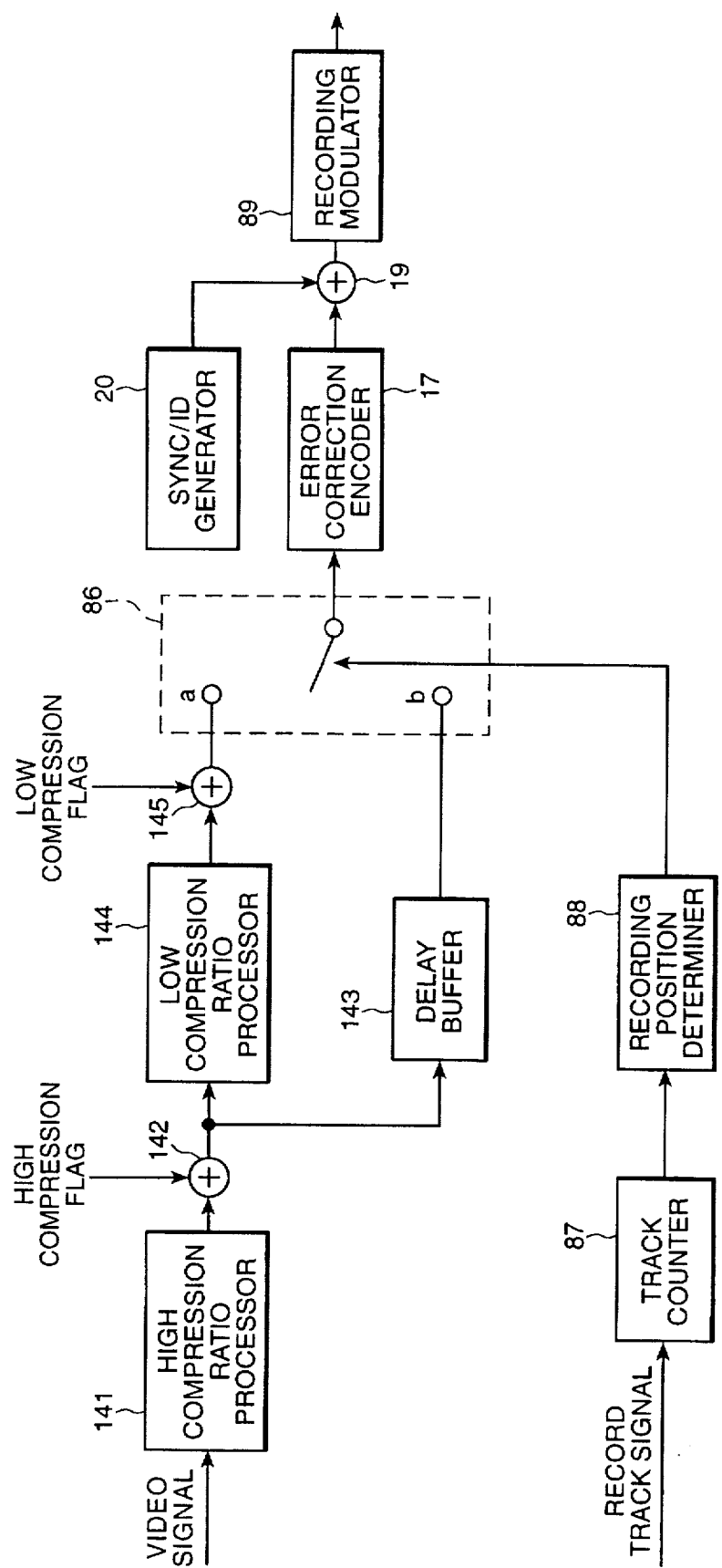
FIG. 53 is a block diagram showing a modification of the recording section of the apparatus according to the fourth embodiment.

FIG. 53 shows a modification of the recording section of the apparatus according to the fourth embodiment. This first modification of the recording section is adapted for performing the multiple stage data compression as shown in FIG. 43(d).

Figure 54:
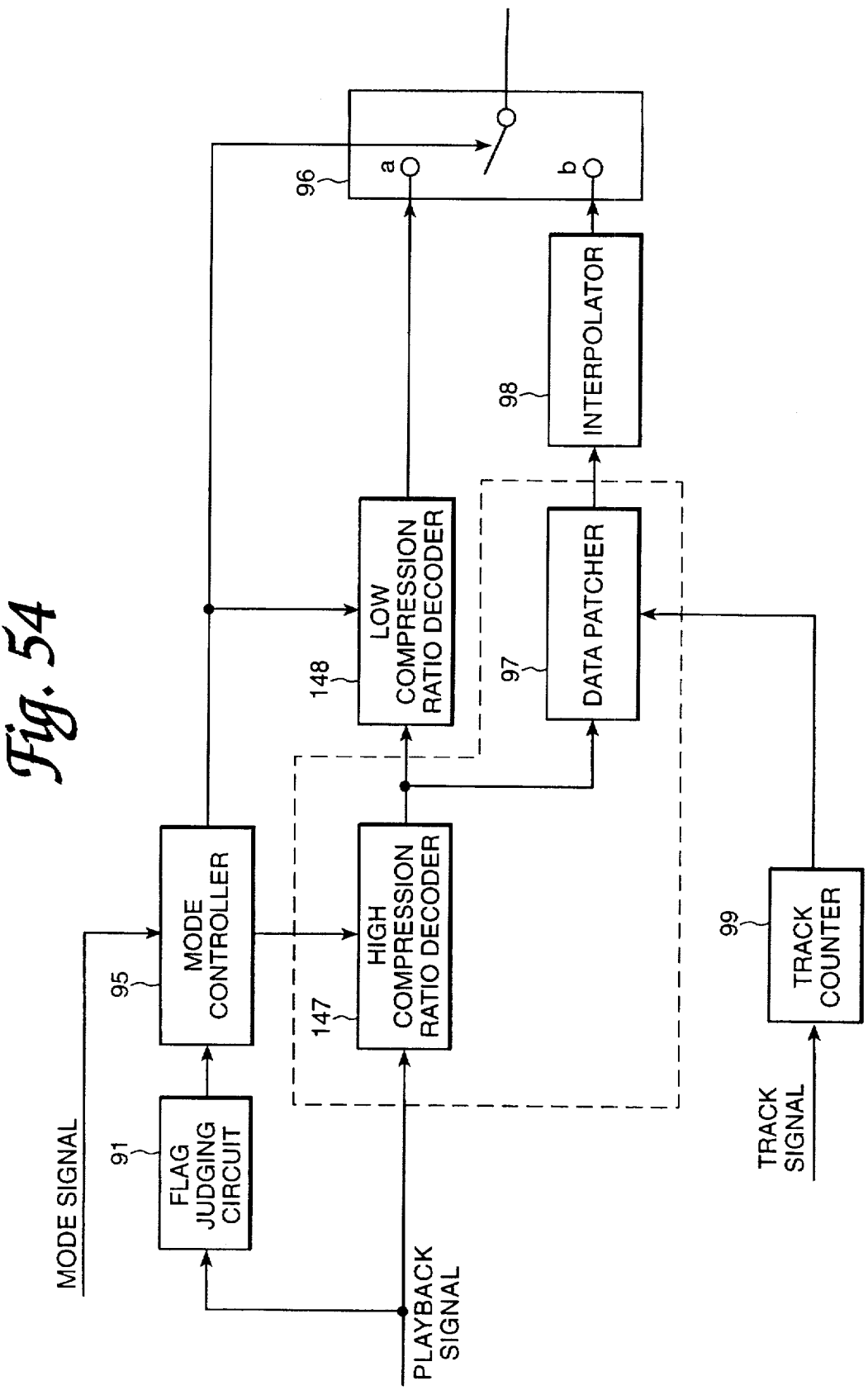
FIG. 54 is a block diagram showing a fourth modification of the playback section of the apparatus according to the fourth embodiment.

FIG. 54 shows a fourth modification of the playback section of the apparatus according to the fourth embodiment, which complies with the modification of the recording section of the apparatus as shown in FIG. 53.

The present invention is not limited to the embodiments described above. For instance, data to be recorded in specific arrangement areas are not limited to DC components of the intra-frame data.

As described above, the present invention can provide an extremely preferable variable length code recording/ playback apparatus which has such an effect that the playback picture quality in the reverse direction playback mode as well as a plurality of specific speed playback modes can be improved.

While there have been illustrated and described what are at present considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation or material to the teaching of the present invention without departing from the scope thereof. Therefore, it is intended that the present invention not be limited to the particular embodiments disclosed as the best modes contemplated for carrying out the present invention, but that the present invention include all embodiments falling within the scope of the appended claims.

What is claimed is:

1. A variable length code encoding apparatus for encoding video data to be recorded on a recording medium with a plurality of tracks, comprising:

multiplexing means for multiplexing said video data and outputting multiplexed data, said multiplexed data comprising interframe data, AC components of intraframe data, and DC components of intraframe data;

subtracting means for subtracting from said multiplexed data a preceding frame data when said interframe data is being encoded;

encoding means for variable length encoding said multiplexed data and outputting variable length encoded data, said variable length encoded data comprising variable length encoded interframe data, variable length encoded AC components of intraframe data and variable length encoded DC components of intraframe data;

memory means for storing said variable length encoded data, said memory means comprising intraframe AC memory means for storing said variable length encoded AC components of intraframe data, intraframe DC memory means for storing said variable length encoded DC components of intraframe data, and interframe memory means for storing said variable length encoded interframe data; and data rearrangement means for rearranging said variable length encoded data so that said variable length encoded DC components of intraframe data are to be recorded at prescribed locations on said recording medium.

2. A variable length code encoding apparatus as in claim 1, wherein said prescribed locations are locations which would be played back if said recording medium was to be played back in an enhanced speed mode.

3. A variable length code encoding apparatus as in claim 2, wherein said enhanced speed mode is a five-times speed mode.

4. A variable length code encoding apparatus as in claim 2, wherein said prescribed locations are identical to locations which would be played back if said recording medium was to be played back in a reverse direction enhanced speed mode.

5. A variable length code encoding apparatus as in claim 1, wherein said prescribed locations are locations in odd numbered tracks which would be played back if said recording medium was to be played back in an enhanced speed mode and locations in even numbered tracks which would be played back if said recording medium was to be played back in a reverse direction enhanced speed mode.

6. A variable length code encoding apparatus as in claim 5, wherein said enhanced speed mode is a five-times speed mode.

7. A variable length code encoding apparatus as in claim 1, wherein said prescribed locations are locations in X contiguous tracks which would be played back if said recording medium was to be played back in a first enhanced speed mode and locations in Y contiguous tracks, immediately following said X contiguous tracks, which would be played back if said recording medium was played back in a second enhanced speed mode, where Y and X are integers and Y is equal to X multiplied by an integer.

8. A variable length code encoding apparatus as in claim 7, wherein X=3 and Y=6.

9. A variable length code encoding apparatus as in claim 7, wherein said locations to be recorded in said X contiguous tracks are identical to locations which would be played back if said recording medium was to be played back in a reverse direction first enhanced speed mode and said locations to be recorded in said Y contiguous are identical to locations which would be played back if said recording medium was to be played back in a reverse direction second enhanced speed mode.

10. A variable length code encoding apparatus as claimed in claim 1, further comprising data length limiter means for limiting bits of said variable length encoded DC components of intraframe data to a prescribed number.

* * * * *